(12) United States Patent
Itani et al.

(10) Patent No.: US 10,914,210 B2
(45) Date of Patent: Feb. 9, 2021

(54) ENGINE UNIT

(71) Applicant: Yanmar Co., Ltd., Osaka (JP)

(72) Inventors: Masahiro Itani, Osaka (JP); Shunsuke Mori, Osaka (JP); Hideo Shiomi, Osaka (JP)

(73) Assignee: YANMAR POWER TECHNOLOGY CO., LTD., Osaka (JP)

(*) Notice: Subject to any disclaimer, the term of this patent is extended or adjusted under 35 U.S.C. 154(b) by 0 days.

(21) Appl. No.: 16/473,848

(22) PCT Filed: Nov. 9, 2017

(86) PCT No.: PCT/JP2017/040391
§ 371 (c)(1),
(2) Date: Jun. 26, 2019

(87) PCT Pub. No.: WO2018/131271
PCT Pub. Date: Jul. 19, 2018

(65) Prior Publication Data
US 2019/0353064 A1    Nov. 21, 2019

(30) Foreign Application Priority Data

Jan. 13, 2017 (JP) .................................. 2017-004513

(51) Int. Cl.
*F01M 13/00* (2006.01)
*F01M 5/00* (2006.01)
*G01K 3/00* (2006.01)

(52) U.S. Cl.
CPC ........ *F01M 13/0011* (2013.01); *F01M 5/001* (2013.01); *G01K 3/005* (2013.01); *F01M 2013/0027* (2013.01)

(58) Field of Classification Search
CPC ............... F01M 13/0011; F01M 5/001; F01M 2013/0027; F01M 11/10; F01M 13/00;
(Continued)

(56) References Cited

U.S. PATENT DOCUMENTS 8,087,403 B2 *  1/2012  Asanuma ........... F01M 13/0011
                                                    123/574
9,777,608 B2 * 10/2017  Weber .................... F01M 11/10
(Continued)

FOREIGN PATENT DOCUMENTS

JP    2005-188350 A    7/2005
JP    2006-111345 A    5/2008
(Continued)

OTHER PUBLICATIONS

International Search Report dated Jan. 26, 2018 issued in corresponding PCT Application PCT/JP2017/040391.

*Primary Examiner* — Joseph J Dallo
*Assistant Examiner* — Kurt Philip Liethen
(74) *Attorney, Agent, or Firm* — Norton Rose Fulbright US LLP

(57) ABSTRACT

An engine unit including a heater provided in a blow-by gas returning path for returning a blow-by gas that leaks out from a combustion chamber of an engine to an intake path. The heater is electrically connected to a controller of the engine through wiring harnesses. The controller is configured to, while controlling energization of the heater, perform an abnormality detection on the wiring harness based on a magnitude of current flowing to the wiring harness during energization of the heater, and perform an abnormality detection on the heater and the wiring harnesses based on a magnitude of voltage applied to the wiring harness located downstream from the heater during non-energization of the heater.

20 Claims, 18 Drawing Sheets

(58) Field of Classification Search
CPC .... F01M 2250/60; G01K 3/005; F02D 41/22; F02D 2200/0414; F02D 2200/021; F02D 2250/08
See application file for complete search history.

(56) References Cited

U.S. PATENT DOCUMENTS

| | | | |
|---|---|---|---|
| 10,006,325 B2 * | 6/2018 | Okazaki | F01M 13/0011 |
| 10,066,523 B2 * | 9/2018 | Okazaki | F02M 25/06 |
| 10,094,255 B2 * | 10/2018 | Okazaki | F24H 3/0452 |
| 2008/0099000 A1 | 5/2008 | Suzuki et al. | |
| 2012/0215426 A1 * | 8/2012 | Sato | F02D 41/042 |
| | | | 701/108 |

FOREIGN PATENT DOCUMENTS

| | | |
|---|---|---|
| JP | 2014-088859 A | 5/2014 |
| JP | 2015-055160 A | 3/2015 |
| JP | 2016-056763 A | 4/2016 |

* cited by examiner

ENGINE UNIT

CROSS REFERENCES TO RELATED APPLICATIONS

This application is a national stage application pursuant to 35 U.S.C. § 371 of International Application No. PCT/JP2017/040391, filed on Nov. 19, 2017 which claims priority under 35 U.S.C. § 119 to Japanese Patent Application No. 2017-004513 filed on Jan. 13, 2017, the disclosures of which are hereby incorporated by reference in their entireties.

TECHNICAL FIELD

The present invention relates to engine units, such as diesel engines, that are mounted on work vehicles like agricultural machinery (including tractors and combine harvesters) or construction machinery (including bulldozers, hydraulic excavators, and loaders) for example.

BACKGROUND ART

A conventional engine unit with a blow-by gas returning path through which blow-by gas that leaks out from a combustion chamber of the engine is returned to an intake path is well known. It is also known to provide a blow-by gas returning path with a heater for preventing freezing of a breather so as to prevent the blow-by gas returning path from becoming blocked because of freezing of moisture contained in blow-by gas, for example, which may otherwise cause increase in internal pressure in a crankcase or the like (see, e.g., Patent Literature 1, which is hereinafter referred to as PTL1).

CITATION LIST

Patent Literature

PTL1: Japanese Patent Application Laid-Open No. 2016-56763

SUMMARY OF INVENTION

Technical Problem

A conventional engine unit, however, has difficulty in detecting a fault in the main body of a heater or a fault of a wiring harness connected to the heater, which is disconnection or short circuit for example. This is because the wiring harness through which electric power is supplied to the heater is connected to a battery with interposition of a relay whose operation is controlled by an ECU.

Solution to Problem

Some aspects of the present invention attempt to provide an engine unit improved through review of such current circumstances.

An engine unit according to an aspect of the present invention includes a heater provided in a blow-by gas returning path for returning blow-by gas that leaks out from a combustion chamber of an engine to an intake path, the heater being electrically connected to a controller of the engine through a wiring harness, the controller being configured to, while controlling energization of the heater, perform abnormality detection on the wiring harness based on magnitude of current flowing to the wiring harness during energization of the heater, and perform abnormality detection on the heater and the wiring harness based on magnitude of voltage applied to the wiring harness located downstream from the heater during non-energization of the heater.

In the aspect of the present invention, the controller may be configured to perform the abnormality detection for the non-energization of the heater if a key switch is turned on.

Further, in the aspect of the present invention, the controller may be configured to perform the abnormality detection for the non-energization of the heater if a temperature of the heater is lower than or equal to a predetermined heater threshold temperature.

Further, in the aspect of the present invention, the controller may be configured to detect the temperature of the heater based on a detected value of a cooling water temperature sensor, a fresh air temperature sensor, or an outside air temperature sensor, the cooling water temperature sensor detecting a cooling water temperature of the engine, the fresh air temperature sensor detecting a temperature of fresh air guided to the intake path, the outside air temperature sensor detecting an outside air temperature.

Further, in the aspect of the present invention, the controller may be configured to perform the abnormality detection for the non-energization of the heater if a key switch is turned on and elapsed time from a halt of the engine is longer than or equal to predetermined time.

Advantageous Effects of Invention

An engine unit according to an aspect of the present invention includes a heater provided in a blow-by gas returning path for returning blow-by gas that leaks out from a combustion chamber of an engine to an intake path, the heater being electrically connected to a controller of the engine through a wiring harness, the controller being configured to, while controlling energization of the heater, detect an abnormality of the wiring harness based on magnitude of current flowing to the wiring harness during energization of the heater, and detect an abnormality of the heater and the wiring harness based on magnitude of voltage applied to the wiring harness located downstream from the heater during non-energization of the heater. Accordingly, a fault of the heater provided in the blow-by gas returning path and the wiring harness connected to the heater can be detected.

DESCRIPTION OF EMBODIMENTS

Figure 1:
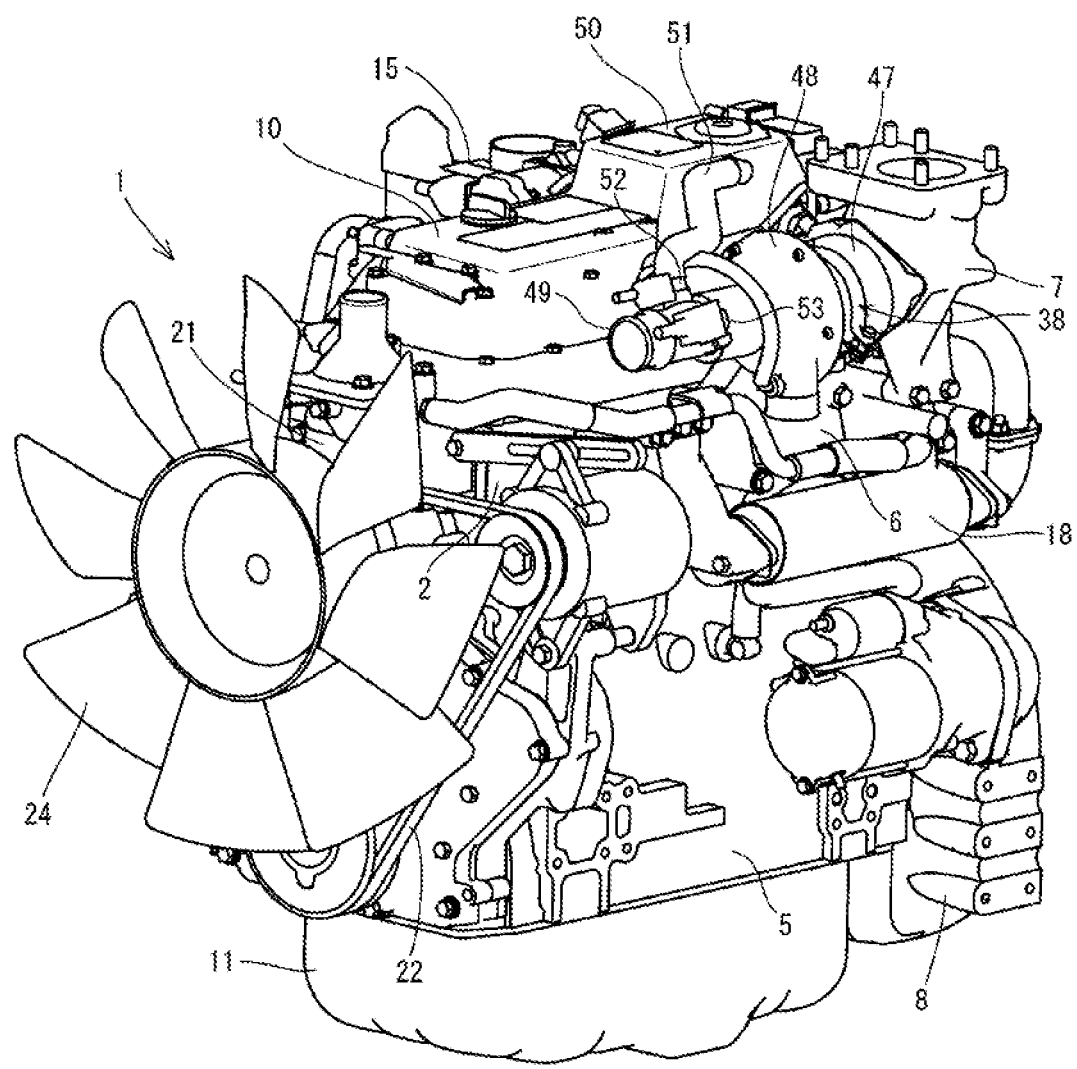
FIG. 1 A front perspective view of an engine.
Figure 2:
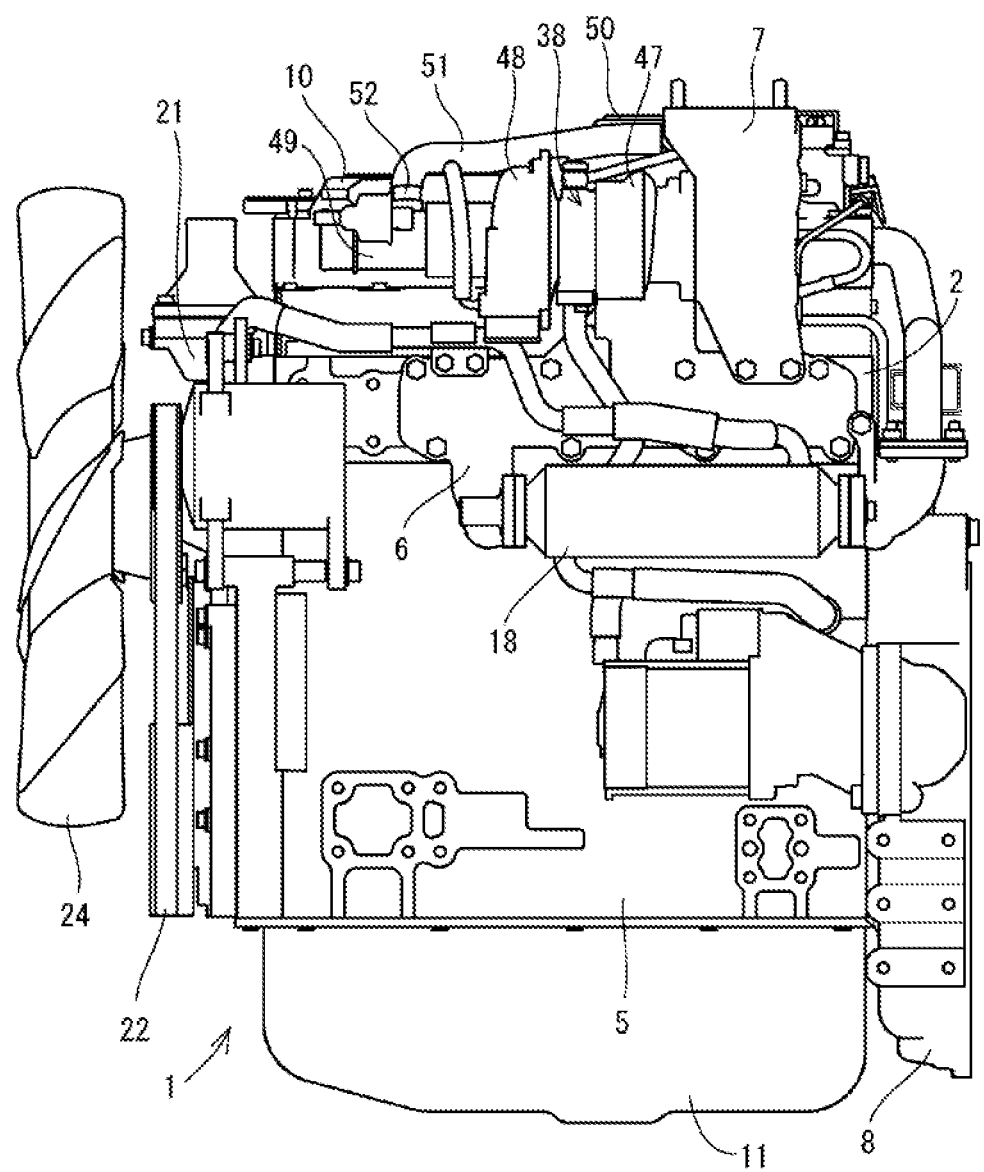
FIG. 2 A left side view of the engine.
Figure 3:
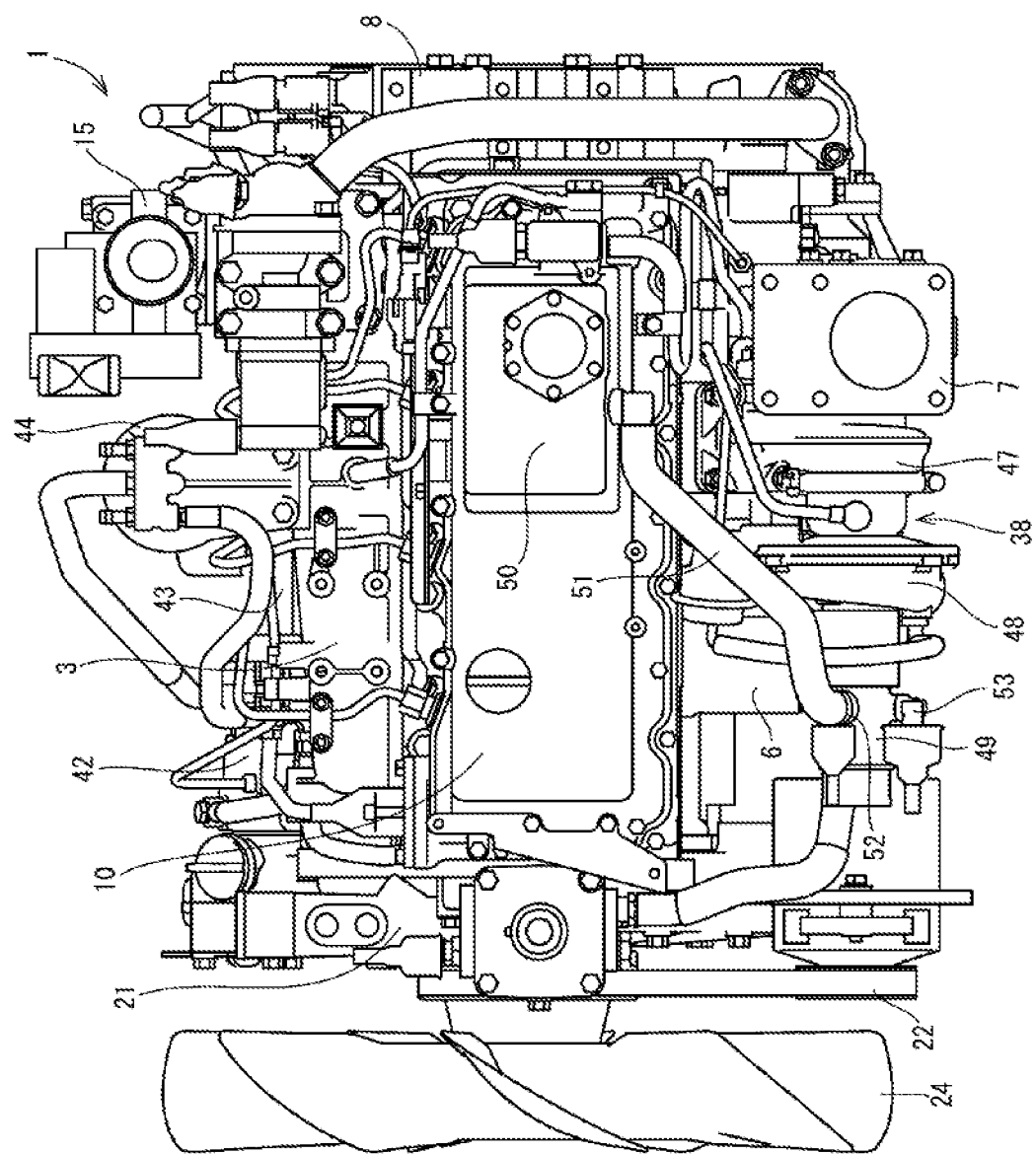
FIG. 3 A plan view of the engine.
Figure 4:
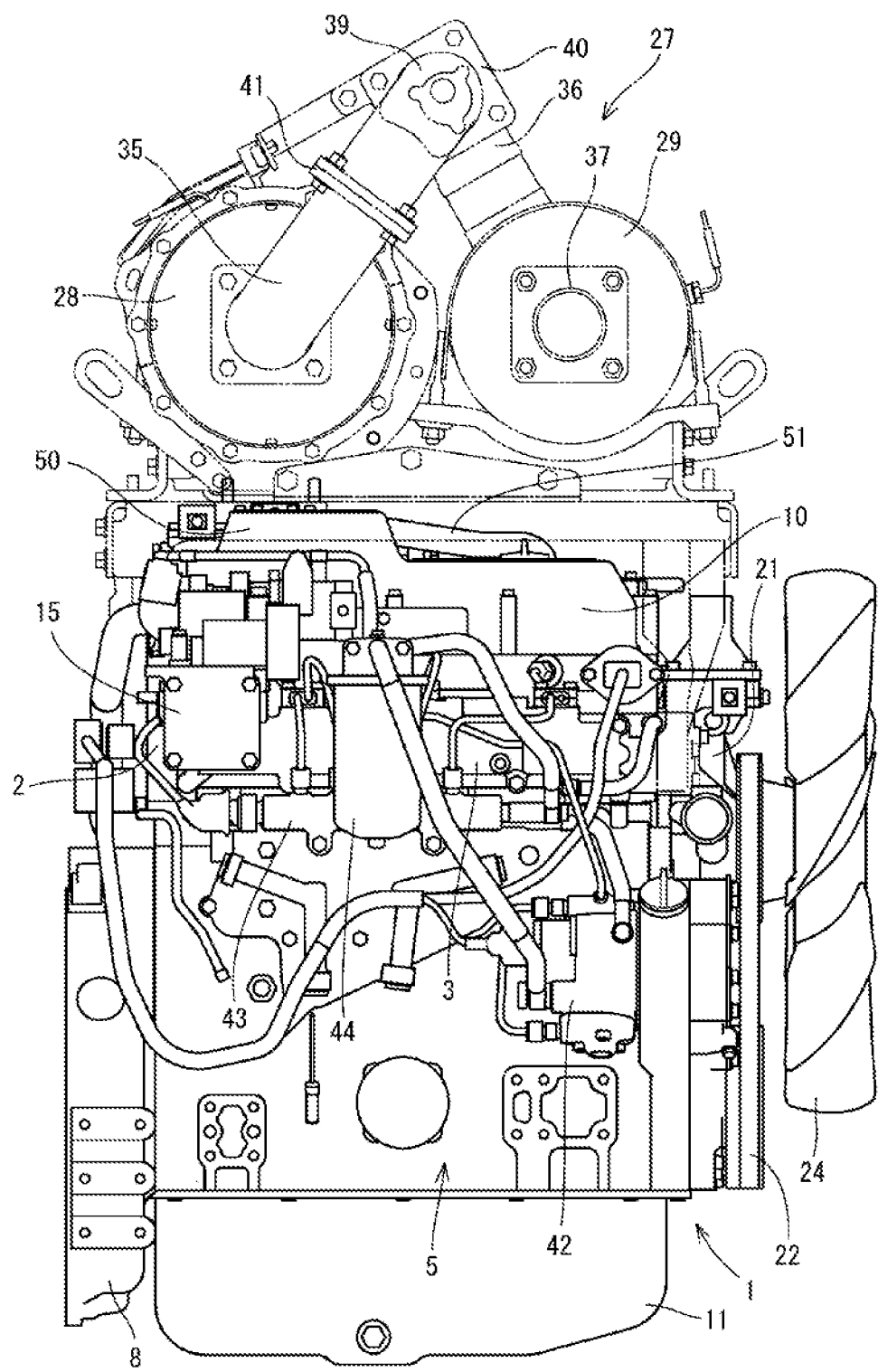
FIG. 4 A right side view of the engine.
Figure 5:
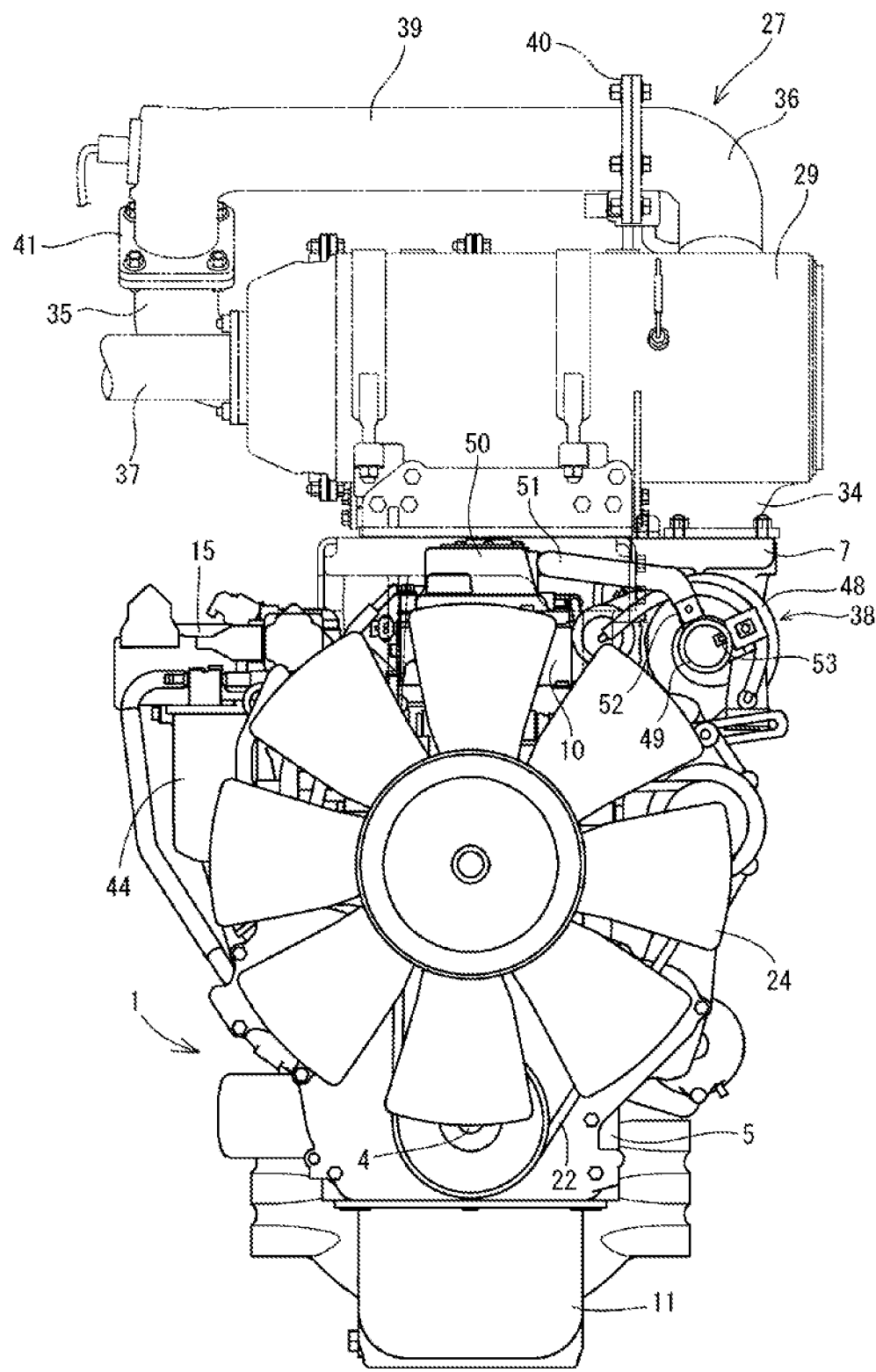
FIG. 5 A front view of the engine.
Figure 6:
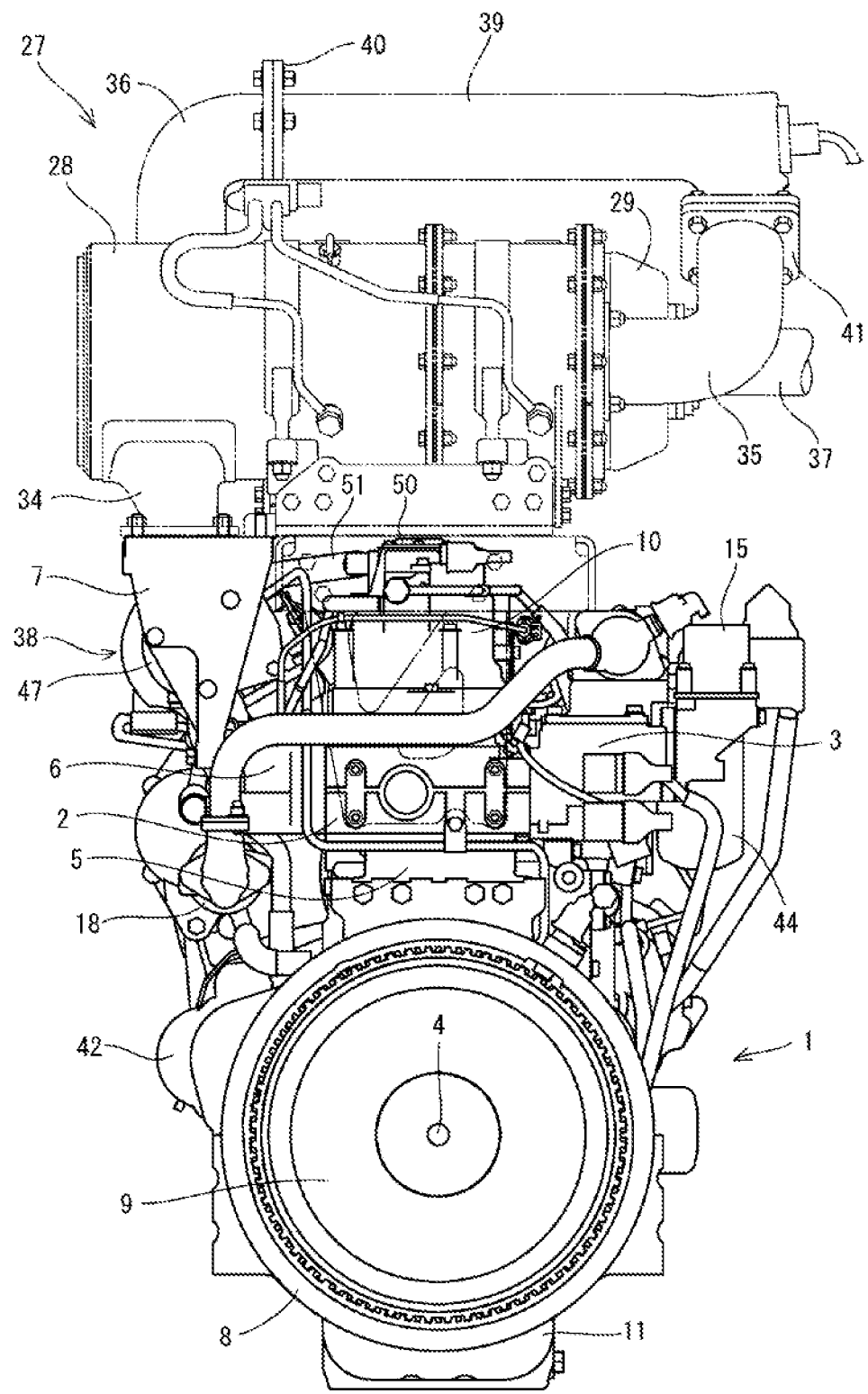
FIG. 6 A back view of the engine.

Specific embodiments of the present invention are described below with reference to the drawings. FIG. 1 is a front perspective view of an engine 1, which is a diesel engine. FIG. 2 is a left side view of the engine 1, where an exhaust manifold 6 is provided. FIG. 3 is a plan view of the engine 1. FIG. 4 is a right side view of the engine 1, where an intake manifold 3 is provided. FIG. 5 is a front view of the engine 1, where a cooling fan 24 is provided. FIG. 6 is a back view of the engine 1. The side on which the exhaust manifold 6 is provided is referred to as the left side of the engine 1. The side on which the intake manifold 3 is provided is referred to as the right side of the engine 1. The side on which the cooling fan 24 is provided is referred to as the front side of the engine 1. The overall structure of the engine 1 is described with reference to FIGS. 1 to 6.

As illustrated in FIGS. 1 to 6, the intake manifold 3 is provided on one side of a cylinder head 2 of the engine 1. The cylinder head 2 is placed over a cylinder block 5 in which an engine output shaft 4 (a crank shaft) and a piston (not illustrated) are positioned. The exhaust manifold 6 is provided on the other side of the cylinder head 2. The front end and rear end of the engine output shaft 4 project from the front side and back side of the cylinder block 5, respectively.

As illustrated in FIGS. 1 to 6, a flywheel housing 8 is fixed on the back side of the cylinder block 5. A flywheel 9 is provided in the flywheel housing 8. The flywheel 9 is pivotally supported on the rear end side of the engine output shaft 4. The flywheel 9 is used to take out the motive force of the engine 1. Further, an oil pan 11 is provided on the lower surface of the cylinder block 5.

As illustrated in FIGS. 3, 4, and 6, the intake manifold 3 is provided with an exhaust gas recirculation (EGR) unit 15. The EGR unit 15 takes in exhaust gas for recirculation. An air cleaner (not illustrated) is connected to the intake manifold 3. Outside air from which dust is removed to be purified in the air cleaner is delivered to the intake manifold 3 and supplied to each cylinder of the engine 1.

The above-described structure causes part of the exhaust gas discharged from the engine 1 to the exhaust manifold 6 to flow back from the intake manifold 3 to each cylinder of the engine 1 via the EGR unit 15. Accordingly, the combustion temperature of the engine 1 can drop and the amount of nitrogen oxide (NOx) emitted from the engine 1 can be reduced. In addition, the fuel efficiency of the engine 1 can be increased.

Figure 20:
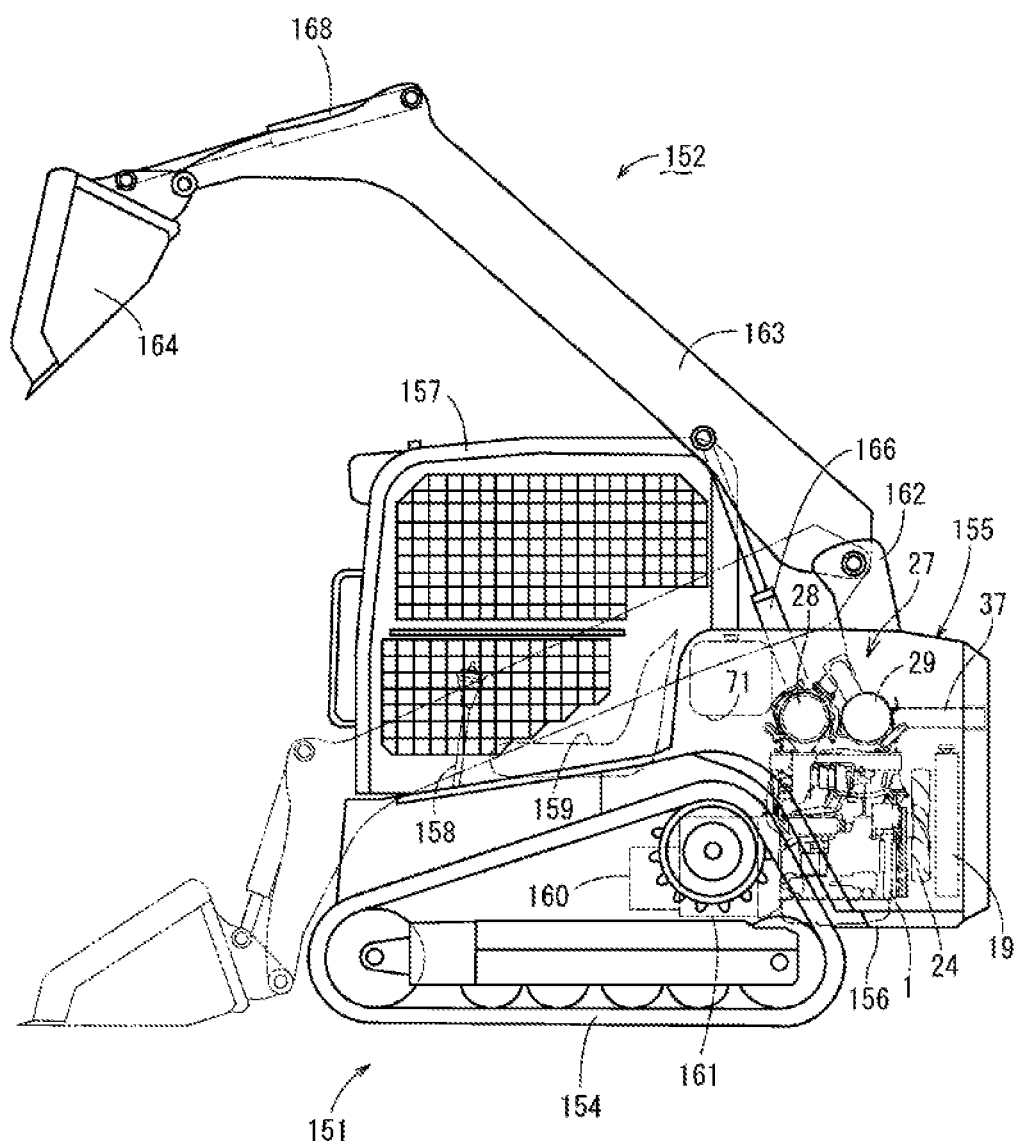
FIG. 20 A side view illustrating an example of a work vehicle where the engine is mounted.
Figure 21:
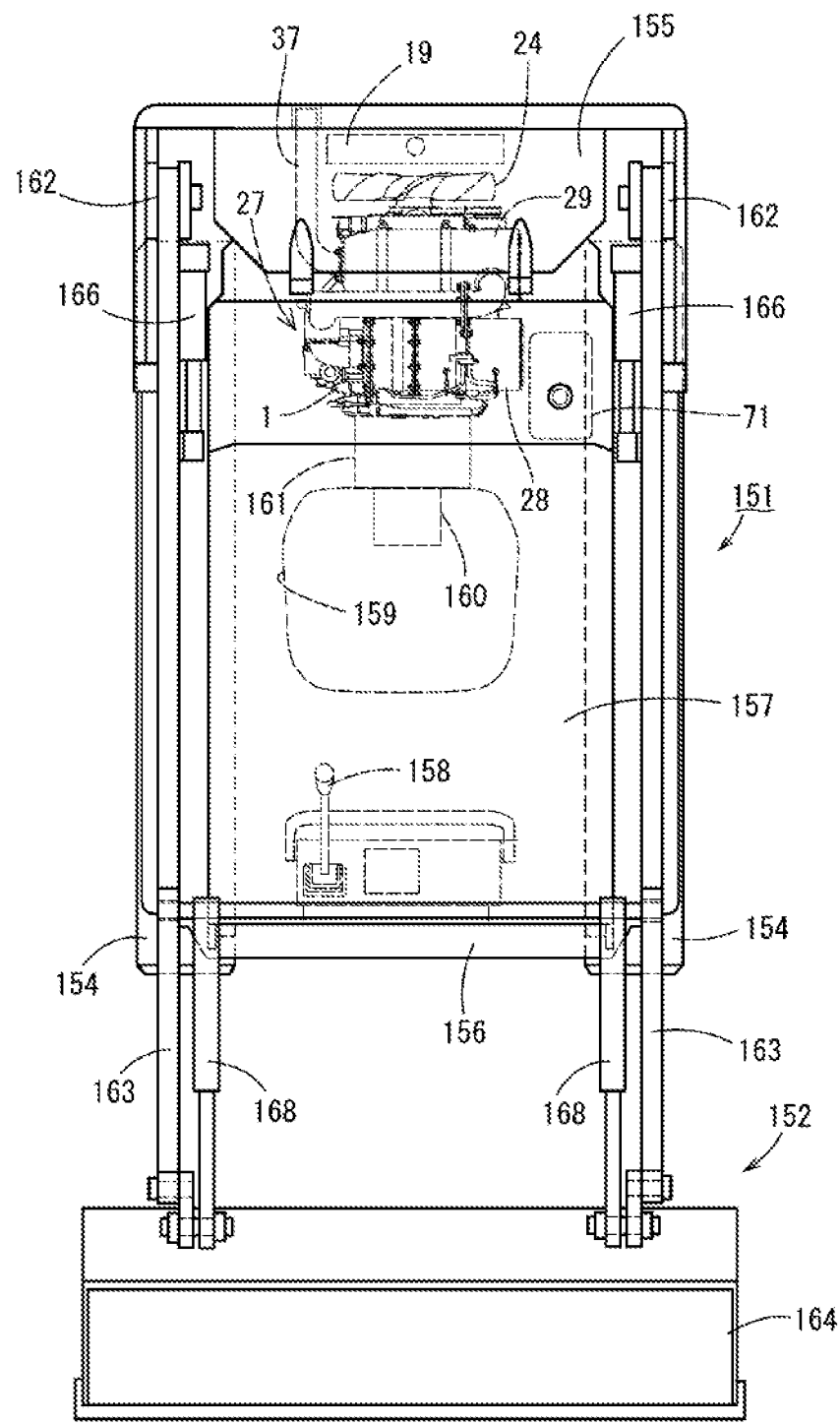
FIG. 21 A plan view illustrating the example of the work vehicle.

The engine 1 further includes a cooling water pump 21 for circulating cooling water into the cylinder block 5 and to a radiator 19 (see FIGS. 20 and 21). The cooling water pump 21 is arranged in the engine 1 on the side on which the cooling fan 24 is provided. The cooling water pump 21 and the cooling fan 24 are coupled to the engine output shaft 4 using a V belt 22 or the like to be driven. While cooling water is delivered from the cooling water pump 21 into the cylinder block 5 through an EGR cooler 18 of the EGR unit 15, the engine 1 is cooled by wind from the cooling fan 24.

As illustrated in FIGS. 1 to 3 and 7, a turbocharger 38 is provided on the left side of a head cover 10 that covers the cylinder head 2 and above the exhaust manifold 6. The turbocharger 38 includes a turbine case 47 in which a turbine wheel (not illustrated) is positioned and a compressor case 48 in which a blower wheel (not illustrated) is positioned. The exhaust inlet side of the turbine case 47 is connected to an outlet portion of the exhaust manifold 6. The exhaust outlet side of the turbine case 47 is coupled to a tail pipe (not illustrated) with interposition of an exhaust gas outlet pipe 7 and an exhaust purifier 27 (see FIGS. 4 to 6). The exhaust gas discharged from each cylinder of the engine 1 to the exhaust manifold 6 is emitted outside from the tail pipe through the turbine case 47 of the turbocharger 38, the exhaust gas outlet pipe 7, the exhaust purifier 27, and the like.

The intake inlet side of the compressor case 48 is coupled to the air cleaner with interposition of an intake pipe 49. The intake outlet side of the compressor case 48 is coupled to the EGR unit 15 with interposition of a turbocharger pipe (not illustrated). The fresh air from which dust is removed in the air cleaner is delivered from the intake pipe 49 to the intake manifold 3 through the compressor case 48 and the EGR unit 15 to be supplied to each cylinder of the engine 1 (a combustion chamber). In the present embodiment, the path from the air cleaner to each cylinder constitutes an intake path.

The intake pipe 49 is coupled to a breather chamber 50 inside the head cover 10 with interposition of a blow-by gas returning pipe 51. The blow-by gas that leaks out from the combustion chamber of the engine 1 undergoes separation and removal of lubricating oil in the breather chamber 50. After that, the resultant blow-by gas is returned to the intake pipe 49 through the blow-by gas returning pipe 51 and a heater 52, and then returned to the intake manifold 3 to be supplied to each cylinder of the engine 1 again. By returning blow-by gas to the intake pipe 49 and delivering the blow-by gas to the combustion chamber again, exhaust gas or blow-by gas containing unburned gaseous mixture can be prevented from being emitted into the air. In the present embodiment, the path in which blow-by gas from the combustion chamber passes through the breather chamber 50 and the blow-by gas returning pipe 51 before meeting fresh air in the intake pipe 49 constitutes a blow-by gas returning path.

Figure 7:
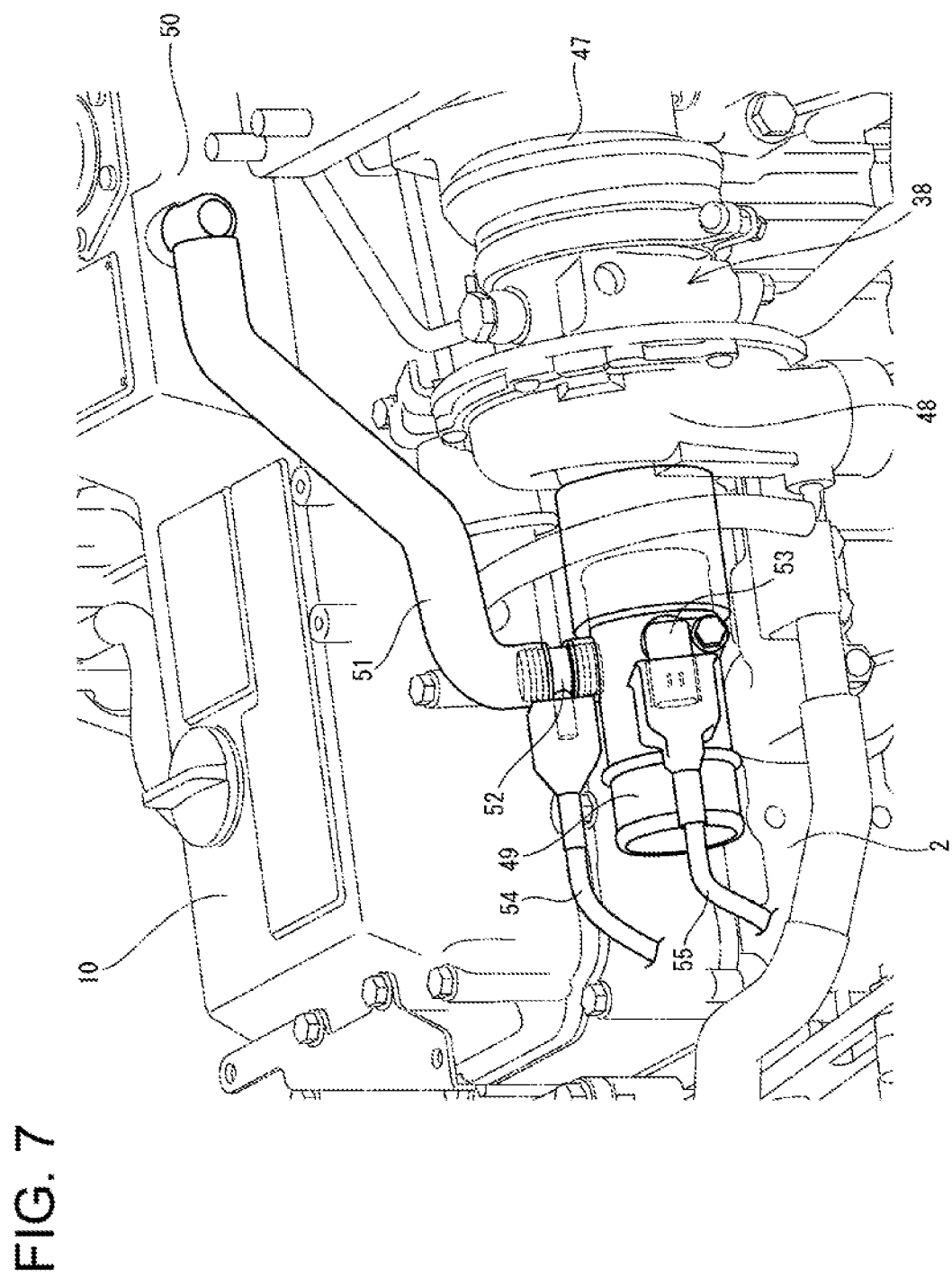
FIG. 7 An enlarged perspective view illustrating an anti-freezing heater and its adjacent area.

As illustrated in FIG. 7, the antifreezing heater 52 for the breather is provided between the blow-by gas returning pipe 51 and the intake pipe 49. A pipe-like portion of the heater 52 allows the blow-by gas returning pipe 51 and the intake pipe 49 to communicate. By causing the heater 52 to generate heat, the blow-by gas returning pipe 51 is prevented from being blocked because of freezing of moisture contained in the blow-by gas, for example. In the present embodiment, the heater 52 is a PTC heater having PTC characteristics, and has characteristics that the resistance value abruptly increases if the temperature exceeds a certain value. A fresh air temperature sensor 53 is attached to the intake pipe 49. The fresh air temperature sensor 53 detects the temperature of fresh air guided to the intake pipe 49. The heater 52 and the fresh air temperature sensor 53 are electrically connected to an engine ECU 100 (see FIG. 8) through wiring harnesses 54 and 55.

As illustrated in FIG. 4, a fuel pump 42 and a common rail 43 are provided to connect a fuel tank (not illustrated) to injectors (not illustrated) for the multiple cylinders of the engine 1. The common rail 43 and a fuel filter 44 are arranged on the side of the cylinder head 2 on which the intake manifold 3 is provided. The fuel pump 42 is provided in the cylinder block 5 below the intake manifold 3. Each of the injectors includes a fuel injection valve (not illustrated) of an electromagnetic switching control type.

While the fuel in the fuel tank is sucked into the fuel pump 42 through the fuel filter 44, the common rail 43 is connected to the discharge side of the fuel pump 42, and the common rail 43 having a cylindrical shape is connected to each injector of the engine 1. From the fuel forcibly delivered from the fuel pump 42 to the common rail 43, redundant part of is returned into the fuel tank and high-pressure fuel is temporarily stored in the common rail 43. The high-pressure fuel in the common rail 43 is supplied into each cylinder of the engine 1.

As illustrated in FIGS. 4 to 6, the exhaust purifier 27 (an exhaust purifying unit) for purifying the exhaust gas discharged from the each cylinder of the engine 1 includes a first case 28 as a diesel particulate filter (DPF) for removing particulate matters in the exhaust gas of the engine 1 and a second case 29 as a urea selective catalytic reduction (SCR) system for removing NOx in the exhaust gas of the engine 1. An oxidation catalyst and a soot filter are provided in the first case 28 as a DPF case in order from the downstream side in the direction in which the exhaust gas moves. An SCR catalyst for urea SCR and an oxidation catalyst are provided in the second case 29 as an SCR case in order from the downstream side in the direction in which the exhaust gas moves.

The exhaust gas discharged from each cylinder of the engine 1 to the exhaust manifold 6 is emitted outside through the exhaust purifier 27 and the like. The exhaust purifier 27 reduces carbon monoxide (CO), hydrocarbon (HC), particulate matters (PM), and NOx in the exhaust gas of the engine 1.

The first case 28 and the second case 29 each have a long cylindrical shape elongated in an orthogonal direction that crosses the engine output shaft 4 of the engine 1 in a plan view (see FIGS. 5 and 6). A DPF inlet pipe 34 for taking in exhaust gas and a DPF outlet pipe 35 for discharging exhaust gas are provided on both sides (one end side and the other end side in the direction in which the exhaust gas moves) of the cylindrical shape of the first case 28. Similarly, an SCR inlet pipe 36 for taking in exhaust gas and an SCR outlet pipe 37 for discharging exhaust gas are provided on both sides (one end side and the other end side in the direction in which the exhaust gas moves) of the second case 29.

While the exhaust manifold 6 and the DPF inlet pipe 34 are caused to communicate through the turbine case 47 of the turbocharger 38 and the exhaust gas outlet pipe 7 to guide the exhaust gas of the engine 1 into the first case 28, the SCR inlet pipe 36 is connected to the DPF outlet pipe 35 with interposition of a urea mixing pipe 39 to guide the exhaust gas in the first case 28 into the second case 29. Further, the DPF outlet pipe 35 and the urea mixing pipe 39 are connected to each other at a DPF outlet side flange body 41 for fastening with bolts so as to be detachable. The SCR inlet pipe 36 and the urea mixing pipe 39 are connected to each other at an SCR inlet side flange body 40 so as to be detachable.

Figure 8:
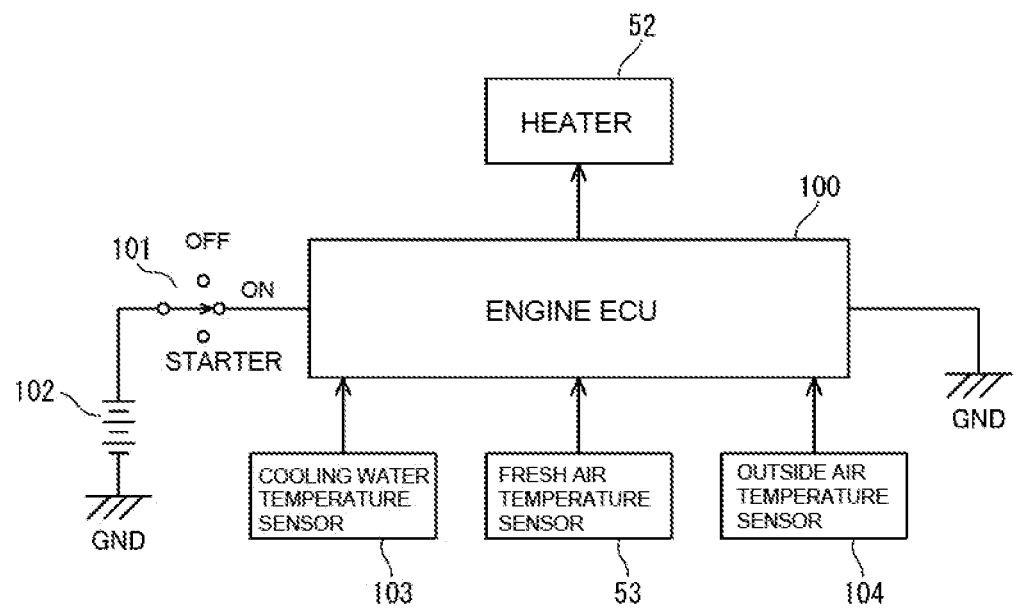
FIG. 8 A function block diagram about control and fault detection of the heater.

Referring to FIGS. 8 to 19, a structure relating to control of the antifreezing heater 52 for the breather is described next. As illustrated in FIG. 8, the engine unit according to the present embodiment includes the engine ECU (controller) 100 for controlling the operation of the engine 1. Although details are omitted, the engine ECU 100 includes a CPU for performing various kinds of computation and control, ROM where various kinds of data are stationarily stored in advance, EEPROM where control programs or various kinds of data are stored as being rewritable, RAM where control programs or various kinds of data are temporarily stored, a timer for time measurement, an input/output interface, and the like. The engine ECU 100 is provided in or near the engine 1.

The engine ECU 100 is connected to a battery 102 with interposition of a key switch 101 for applying power. The key switch 101 is a rotary switch that can be rotated and operated with a predetermined key inserted in a key hole to three terminal positions, which are an OFF position, an ON position, and a STARTER position. The ON position (terminal) of the key switch 101 is connected to the input side of the engine ECU 100.

In relation to control and fault determination of the antifreezing heater 52 for the breather, a cooling water temperature sensor 103, the fresh air temperature sensor 53, or an outside air temperature sensor 104 is connected to the input side of the engine ECU 100. The cooling water temperature sensor 103 detects a cooling water temperature of the engine 1. The fresh air temperature sensor 53 detects the temperature of fresh air guided to the intake pipe 49 (see FIG. 7) that forms part of the intake path. The outside air temperature sensor 104 detects an outside air temperature of a vehicle on which the engine 1 is mounted, or the like. The heater 52 is connected to the output side of the engine ECU 100. The heater 52 is provided between the blow-by gas returning pipe 51 (see FIG. 7), which forms part of the blow-by gas returning path, and the intake pipe 49. The sensors 53, 103, and 104, the heater 52, and the key switch 101 are electrically connected through wiring harnesses, such as the wiring harnesses 54 and 55 (see FIG. 7). Although not illustrated, various sensors and the like provided in the engine 1 are connected to the input side of the engine ECU 100, and various devices and the like provided in the engine 1 are connected to the output side of the engine ECU 100.

Figure 9:
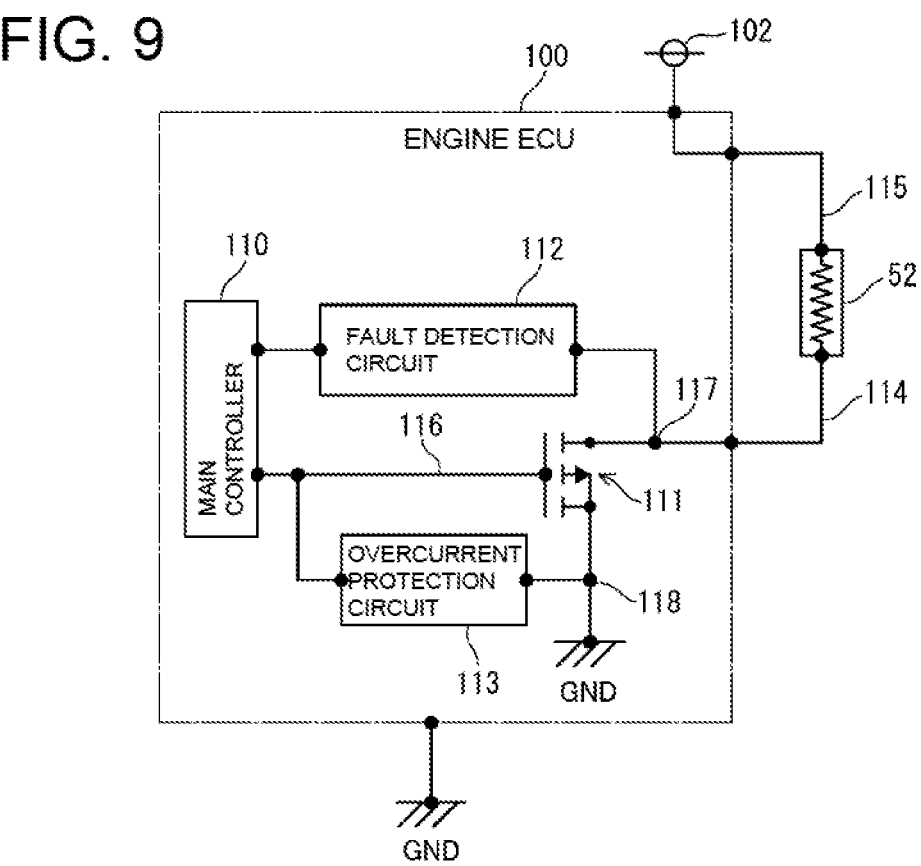
FIG. 9 A circuit diagram about control and fault detection of the heater.

As illustrated in FIG. 9, a main controller 110, which is a microcontroller (microcomputer), is provided in the engine ECU 100. In relation to control and fault determination of the antifreezing heater 52 for the breather, a switching element 111 for the heater, a fault detection circuit 112, and an overcurrent protection circuit 113 are further provided.

The switching element 111 is a field effect transistor (FET) and is connected in series between a grounded side electric wire 114 (the wiring harness located downstream from the heater 52) connected to one end of the heater 52 and a ground GND. The gate terminal of the switching element 111 is connected to the main controller 110 through a signal line 116. An ungrounded side electric wire 115 connected to the other end of the heater 52 is connected to the battery 102 with interposition of the engine ECU 100. The electric wires 114 and 115 are provided in the wiring harness 54 (see FIG. 7) that connects the heater 52 to the engine ECU 100.

The fault detection circuit 112 is connected in series between a contact point 117 and the main controller 110. The contact point 117 is located between the switching element 111 and the grounded side electric wire 114. The fault detection circuit 112 detects the magnitude of the voltage applied to the grounded side electric wire 114 by detecting the voltage applied to the contact point 117. The overcurrent protection circuit 113 is connected in series between a contact point 118 and the signal line 116. The contact point 118 is located between the switching element 111 and the ground GND. The overcurrent protection circuit 113 monitors the magnitude of the current flowing to the grounded side electric wire 114 and the switching element 111 by monitoring the magnitude of the current flowing to the contact point 118. If a large current flows to the switching element 111, the overcurrent protection circuit 113 turns the switching element 111 off to prevent destruction of the switching element 111.

The engine ECU 100 controls switching between energization and non-energization of the heater 52 by the main controller 110 turning the switching element 111 on or off using the signal line 116.

Figure 10:
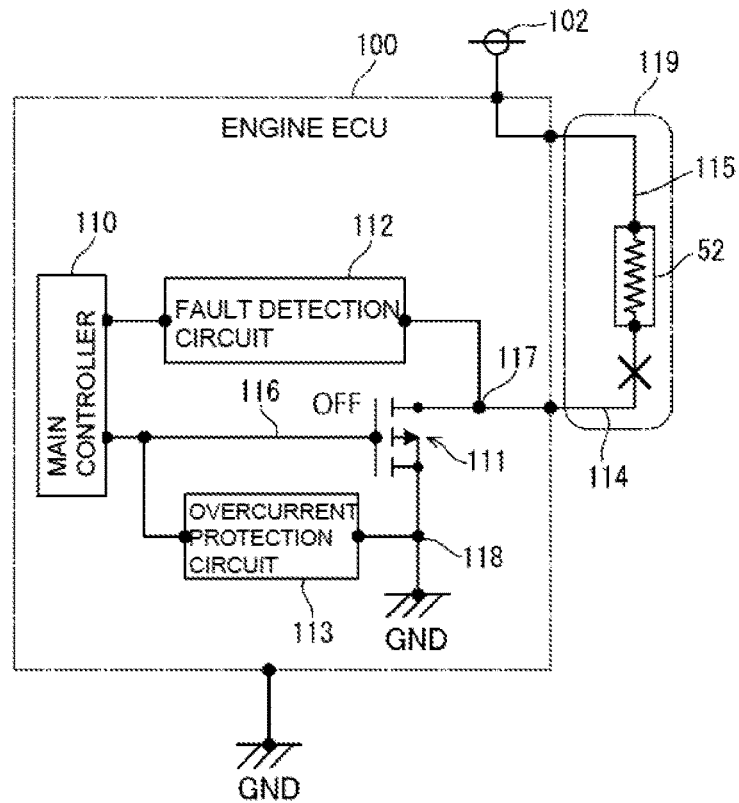
FIG. 10 A diagram schematically illustrating disconnection in a wiring harness.
Figure 11:
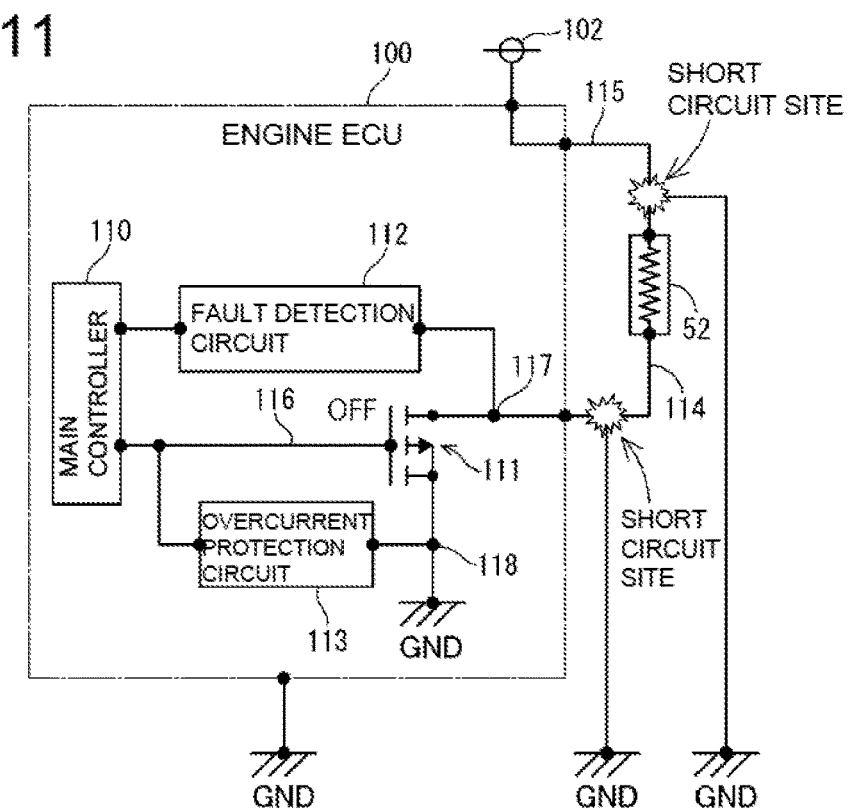
FIG. 11 A diagram schematically illustrating a GND short circuit.

Further, the engine ECU 100 detects an abnormality of the heater 52 and the electric wires 114 and 115 by, during non-energization of the heater 52, the fault detection circuit 112 detecting the magnitude of the voltage applied to the grounded side electric wire 114 (the contact point 117). If, during non-energization of the heater 52, no abnormality is detected in the heater 52 or the electric wires 114 and 115, the voltage of the contact point 117 equals the voltage of the battery 102. As illustrated in FIG. 10, if disconnection occurs somewhere in a region 119 of the heater 52 and the electric wires 114 and 115, the potential at the contact point 117 becomes a floating potential, which is lower than the potential of the battery 102. As illustrated in FIG. 11, if the electric wires 114 and 115 cause GND short circuits (ground short circuits), the potential at the contact point 117 becomes the potential at the ground GND. Thus, faults (disconnection and a GND short circuit) of the heater 52 and the electric wires 114 and 115 can be detected by the fault detection circuit 112 detecting the magnitude of the voltage applied to the contact point 117.

The abnormality detection for the heater 52 and the electric wires 114 and 115 during non-energization of the heater 52 is performed if the temperature of the heater 52 is lower than or equal to a predetermined heater threshold temperature. The reason for this is that, since the internal resistance value of the heater 52 rises as the temperature of the heater 52 rises with rise in the blow-by gas temperature or heat generation of the heater 52, false detection indicating disconnection could happen even if the heater 52 is operating normally. If a sensor that directly detects the temperature of the heater 52 is mounted on the engine 1, manufacture cost of the engine 1 increases and the structure around the heater 52 becomes complicated. The blow-by gas temperature correlates with the cooling water temperature of the engine 1 to some extent. Therefore, the blow-by gas temperature and the temperature of the heater 52 can be estimated by detecting the cooling water temperature using a detected value of the cooling water temperature sensor 103. False detection can be prevented by causing a predetermined threshold temperature of the cooling water temperature corresponding to the temperature of the heater 52 that is low enough to avoid false detection of disconnection in the heater 52 to be stored in advance in a memory (e.g. ROM) in the main controller 110 and performing abnormality detection if the cooling water temperature is lower than or equal to the predetermined threshold temperature.

Figure 12:
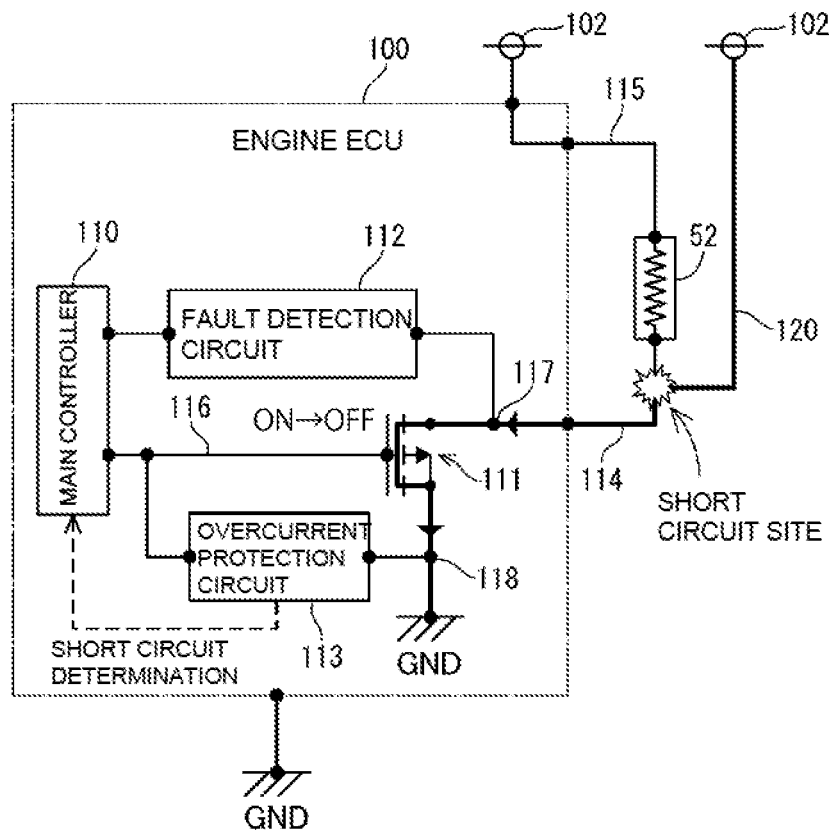
FIG. 12 A diagram schematically illustrating a VB short circuit.

Further, during energization of the heater 52, the engine ECU 100 detects an abnormality of the grounded side electric wire 114 by the overcurrent protection circuit 113 detecting overcurrent flowing to the grounded side electric wire 114 (the contact point 118). As illustrated in FIG. 12, if the grounded side electric wire 114 and another power supply electric wire 120 become short-circuited and cause a VB short circuit (a battery voltage short circuit) during energization of the heater 52, the grounded side electric wire 114 becomes connected to the battery 102 without being connected through the heater 52. Accordingly, a large current flows to the grounded side electric wire 114, the switching element 111, and the terminals (contact points) 117 and 118. If the overcurrent protection circuit 113 detects a large current flowing to the terminal 117, the overcurrent protection circuit 113 turns the switching element 111 off using the signal line 116 and transmits a signal indicating detection of a large current to the main controller 110. Thus, a fault (a VB short circuit) of the grounded side electric wire 114 can be detected by the overcurrent protection circuit 113 detecting a large current flowing to the contact point 118.

Figure 13:
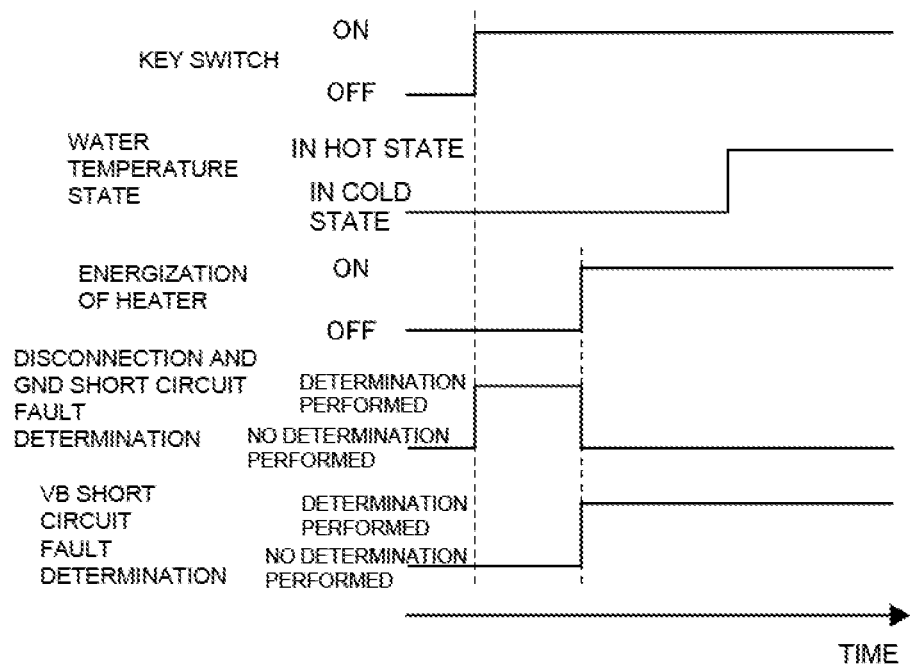
FIG. 13 A time chart for describing an example of a timing at which fault determination is performed.
Figure 14:
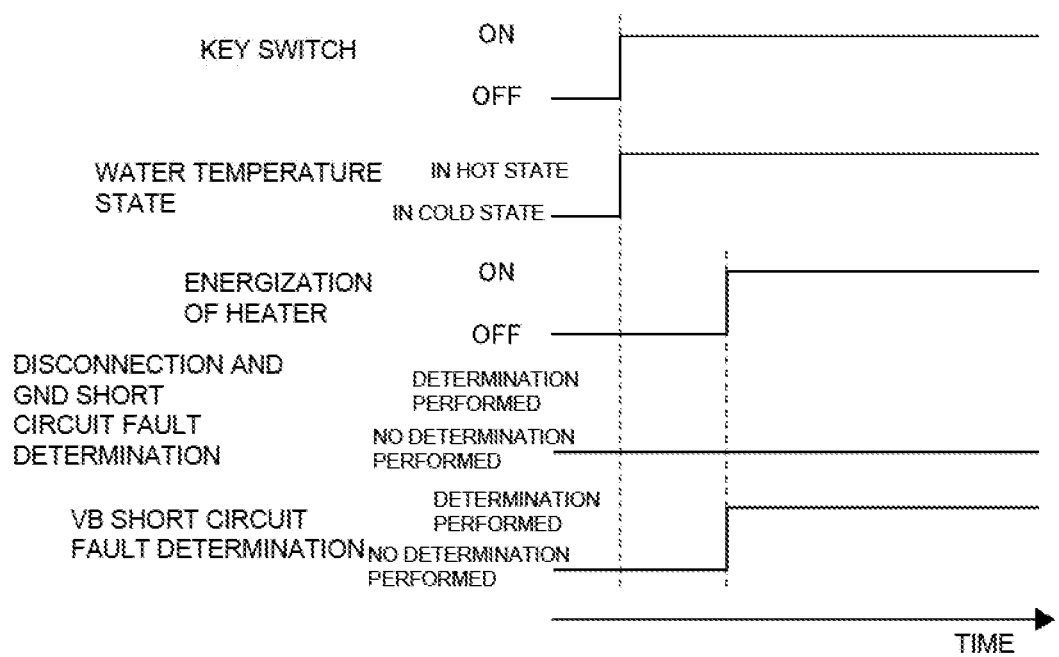
FIG. 14 A time chart for describing another example of a timing at which fault determination is performed.
Figure 15:
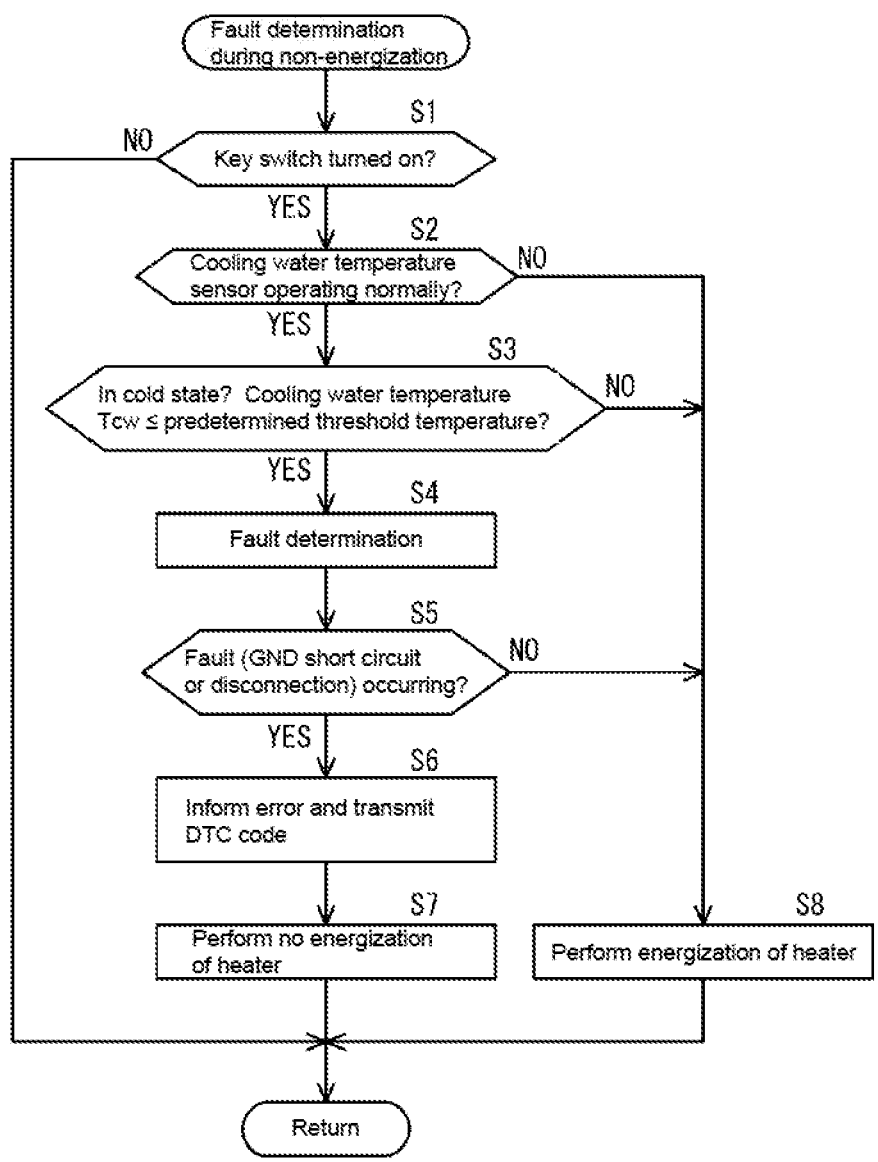
FIG. 15 A flow chart illustrating an embodiment of fault determination during non-energization of the heater.

Referring to FIGS. 8 and 13 to 15, a procedure of fault determination during non-energization of the heater 52 is described. As illustrated in FIG. 15, if the key switch 101 is turned on (YES in step S1) and the cooling water temperature sensor 103 is determined as being operating normally (YES in step S2), the engine ECU 100 determines whether the engine 1 is in a cold state or a hot state, specifically whether a cooling water temperature Tcw is lower than or equal to a predetermined threshold temperature (step S3) so as to confirm that the heater 52 is not in a high temperature state (a high resistance value state).

If the cooling water temperature Tcw is lower than or equal to the predetermined threshold temperature (YES in step S3), as described above with reference to FIGS. 10 and 11, the engine ECU 100 determines whether a fault (disconnection and a GND short circuit) is occurring in the heater 52 and the electric wires 114 and 115 (step S4) by the fault detection circuit 112 detecting the magnitude of the voltage applied to the contact point 117. The fault determination on disconnection and a GND short circuit is performed during cold starting of the engine 1 (see FIG. 13) and is not performed during hot starting of the engine 1 (see FIG. 14).

If the engine ECU 100 determines that a GND short circuit or disconnection is occurring in the heater 52 or the electric wires 114 and 115 (YES in step S5), the engine ECU 100 transmits an error informing signal and a DTC code (a fault diagnostic code) to another ECU (not illustrated), such as a work machine ECU of a work machine on which the engine 1 is mounted (step S6) and turns the switching element 111 off so as not to perform energization of the heater 52 (step S7).

If the cooling water temperature sensor 103 is not operating normally (NO in step S2), if the engine 1 is in a hot state (NO in step S3), or if it is determined that no disconnection or GND short circuit is occurring in the heater 52 or the electric wires 114 and 115 (NO in step S5), the engine ECU 100 turns the switching element 111 on so as to perform energization of the heater 52 (step S8).

In the present embodiment, the temperature of the heater 52 is detected based on a detected value of the cooling water temperature sensor 103. Instead, the temperature of the heater 52 may be detected based on a detected value of the fresh air temperature sensor 53 or the outside air temperature sensor 104. The temperature of the heater 52 can be estimated from the outside air temperature by using a detected value of the fresh air temperature sensor 53 or the outside air temperature sensor 104. If a detected value of the fresh air temperature sensor 53 or the outside air temperature sensor 104 is used as an indicator in detecting the temperature of the heater 52, a predetermined threshold suitable for such detected values is stored in advance in a memory (e.g. ROM) in the main controller 110. It is then determined through comparison between the detected value and the predetermined threshold whether the temperature of the heater 52 is lower than or equal to a predetermined heater threshold temperature. Only if the temperature of the heater 52 is lower, fault detection for non-energization is performed.

Figure 16:
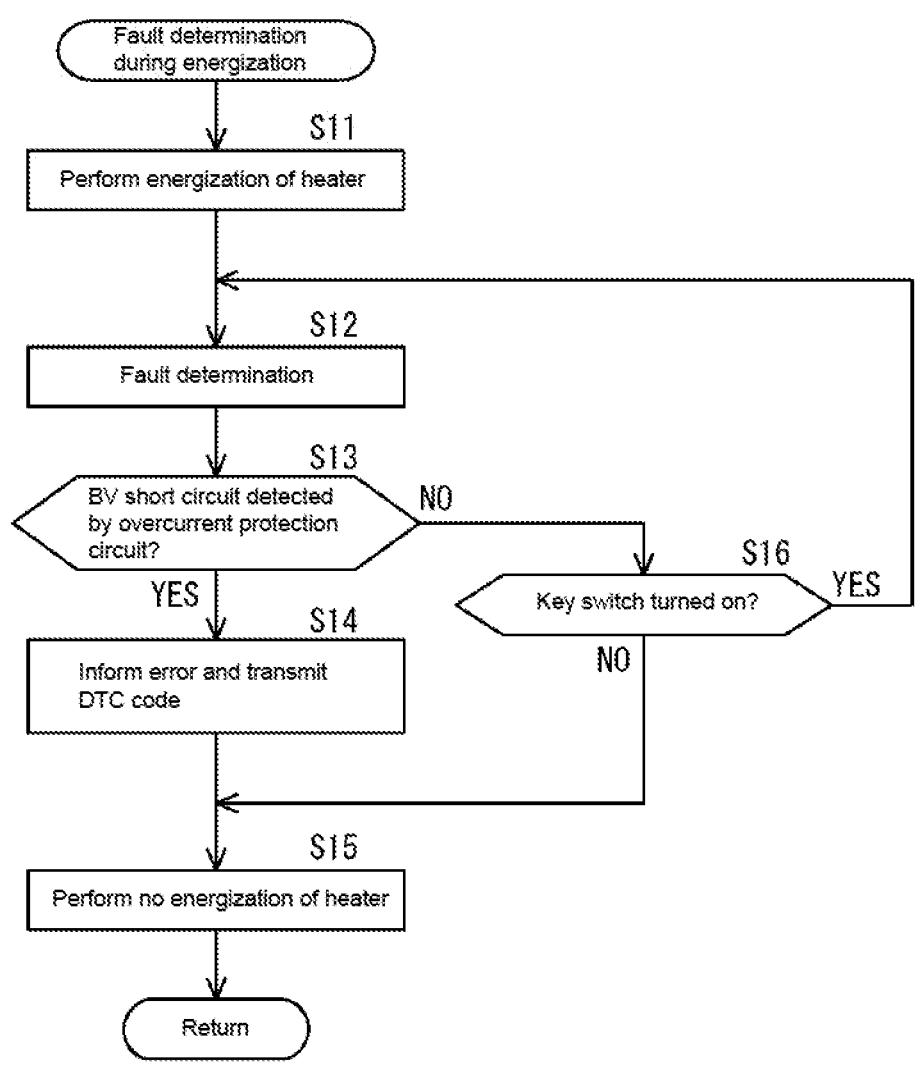
FIG. 16 A flow chart illustrating an embodiment of fault determination during energization of the heater.

Referring to FIGS. 13, 14, and 16, a procedure of fault determination during energization of the heater 52 is described next. As illustrated in FIG. 16, during energization of the heater 52 (step S11), the engine ECU 100 determines that a fault (a VB short circuit) is occurring in the grounded side electric wire 114 (step S12) by the overcurrent protection circuit 113 detecting a large current flowing to the contact point 118 as described above with reference to FIG. 12. If the overcurrent protection circuit 113 detects a VB short circuit (a large current) (YES in step S13), the engine ECU 100 transmits an error informing signal and a DTC code to another ECU, such as an unillustrated work machine ECU (step S14), and turns the switching element 111 off so as to stop the energization of the heater 52 (step S15).

If the overcurrent protection circuit 113 detects no VB short circuit (NO in step S13) and the key switch 101 is turned on (YES in step S16), the procedure returns to step S12 and the engine ECU 100 performs fault determination. If the key switch 101 is turned off (NO in step S16), supply of electric power to the heater 52 and the engine ECU 100 is stopped and the energization of the heater 52 is stopped. As illustrated in FIGS. 13 and 14, while energization of the heater 52 is being performed, the overcurrent protection circuit 113 monitors the magnitude of the current flowing to the contact point 118 and fault determination on a VB short circuit is continued.

Figure 17:
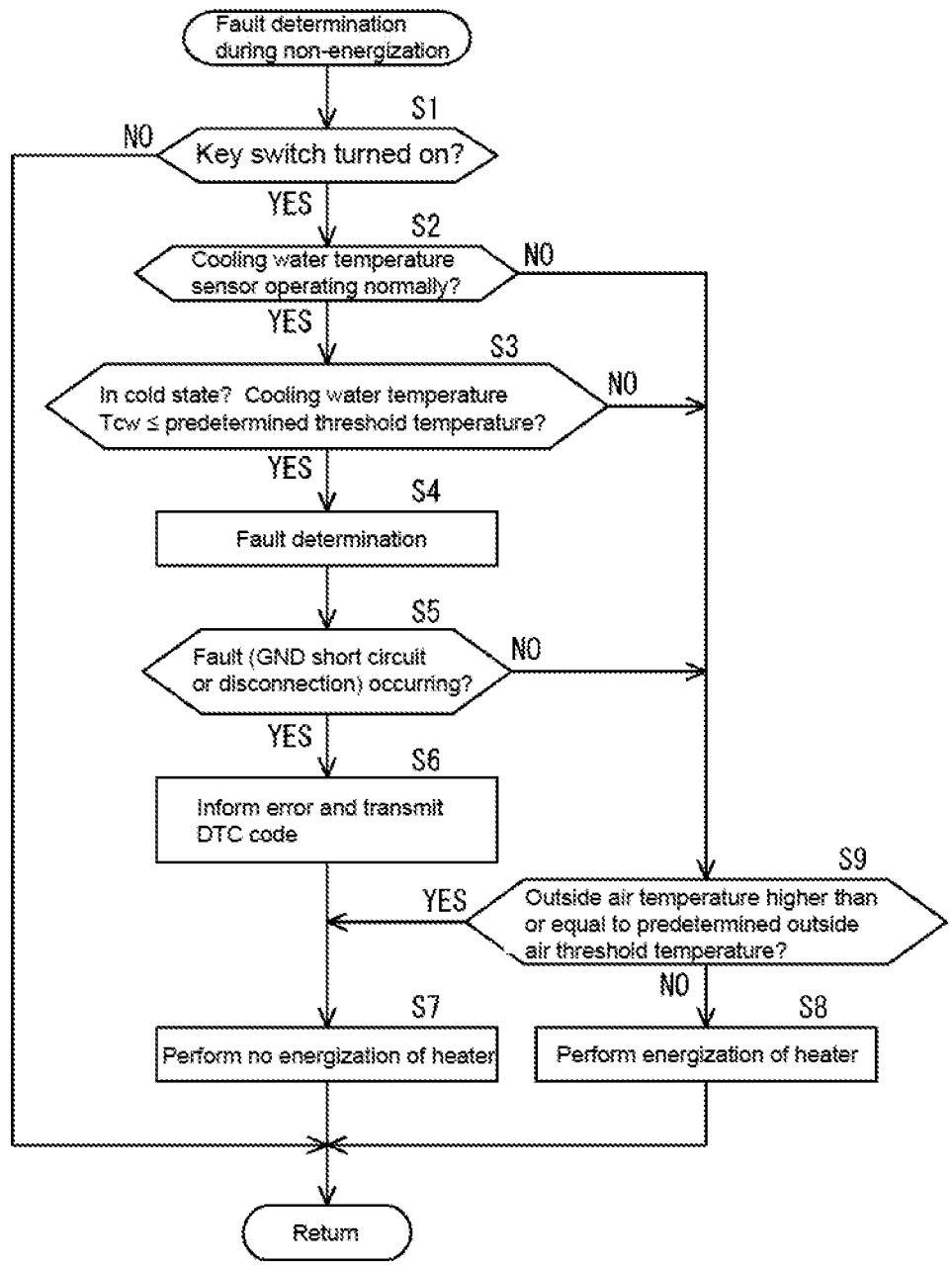
FIG. 17 A flow chart illustrating another embodiment of fault determination during non-energization of the heater.

Referring to FIG. 17, another embodiment of fault determination during non-energization of the heater 52 is described next. In the present embodiment, in contrast to the embodiment of the fault determination illustrated in FIG. 15, if there is no possibility of freezing of the blow-by gas returning pipe 51 that forms part of the blow-by gas returning path, no energization is performed on the heater 52. That is, if the cooling water temperature sensor 103 is not operating normally (NO in step S2), if the engine 1 is in a hot state (NO in step S3), or if it is determined that no disconnection or GND short circuit is occurring in the heater 52 or the electric wires 114 and 115 (NO in step S5) and if the outside air temperature is higher than or equal to a predetermined outside air threshold temperature (YES in step S9), the switching element 111 is turned off so as not to perform energization of the heater 52 (step S7). If the outside air temperature is lower than the predetermined outside air threshold temperature (NO in step S9), the switching element 111 is turned on so as to perform energization of the heater 52 and prevents freezing of the blow-by gas returning pipe 51 (step S8).

Figure 18:
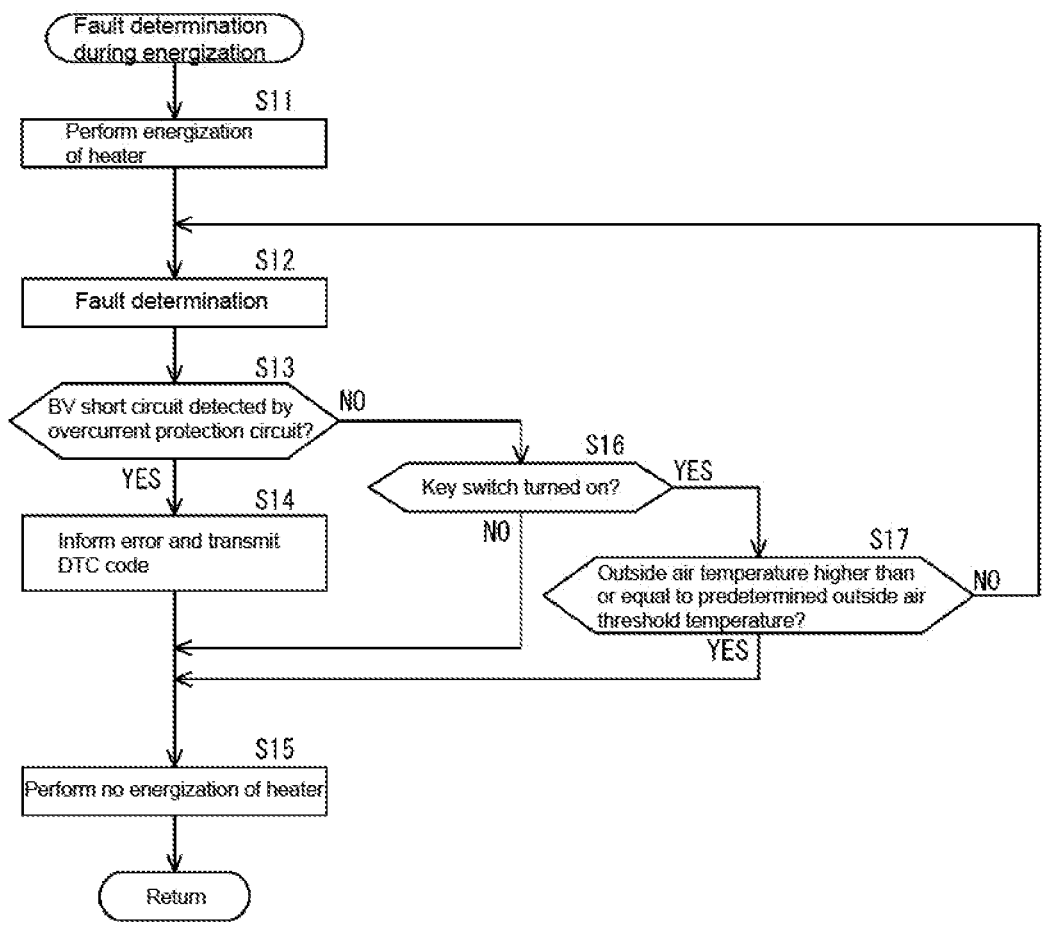
FIG. 18 A flow chart illustrating another embodiment of fault determination during energization of the heater.

Referring to FIG. 18, another embodiment of fault determination during energization of the heater 52 is described. Also in the present embodiment, if there is no possibility of freezing of the blow-by gas returning pipe 51, no energization is performed on the heater 52. That is, if the overcurrent protection circuit 113 detects no VB short circuit (NO in step S13), if the key switch 101 is turned on (YES in step S16), and if the outside air temperature detected in the outside air temperature sensor 104 is higher than or equal to a predetermined outside air threshold temperature (YES in step S17), the switching element 111 is turned off so as to interrupt energization of the heater 52. If the outside air temperature is lower than the predetermined outside air threshold temperature (NO in step S17), the procedure returns to step S12 and fault determination is performed while the energization of the heater 52 is maintained.

As illustrated in FIGS. 17 and 18, the heater 52, the blow-by gas returning pipe 51, and the intake pipe 49 can be prevented from being heated excessively by heat generation of the heater 52 by not performing energization on the heater 52 if there is no possibility of freezing of the blow-by gas returning pipe 51. Accordingly, rise in the temperature of fresh air guided to the intake pipe 49 can be suppressed and reduction in the longevity of these components can be prevented.

No possibility of freezing of the blow-by gas returning pipe 51 can be determined not only based on the outside air temperature but also based on the temperature of the fresh air (a detected value of the fresh air temperature sensor 53) guided to the intake pipe 49 through the air cleaner or the cooling water temperature (a detected value of the cooling water temperature sensor 103) that correlates with the blow-by gas temperature to some extent.

Figure 19:
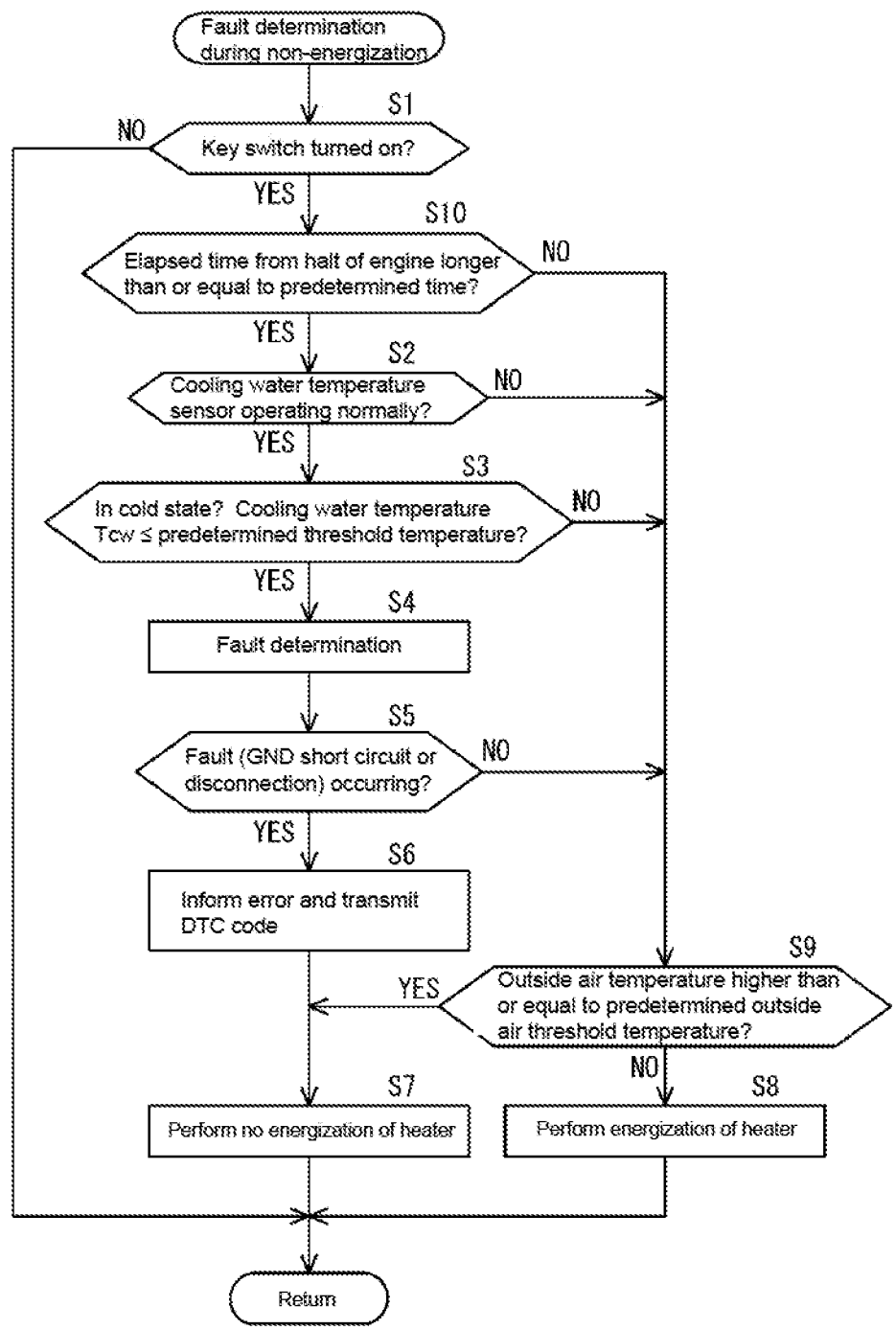
FIG. 19 A flow chart illustrating still another embodiment of fault determination during non-energization of the heater.

Referring to FIG. 19, still another embodiment of fault determination during non-energization of the heater 52 is described next. In the present embodiment, based on elapsed time from a halt of the engine 1, it is determined whether the engine 1 is in a cold state or in a hot state. That is, after the key switch 101 is turned on (YES in step S1), it is determined whether time that has elapsed from a halt of the engine 1 is longer than or equal to predetermined time (step S10). The elapsed time from a halt of the engine 1 can be measured with, for example, a timer for time measurement provided in the engine ECU 100 or a timer provided in an ECU (not illustrated) of a work machine or the like on which the engine 1 is mounted. It can be determined whether the engine 1 is in a cold state or in a hot state by determining the elapsed time from a halt of the engine 1.

If time longer than or equal to the predetermined time has elapsed from a halt of the engine 1 (YES in step S10) and if the cooling water temperature sensor 103 is operating normally and the cooling water temperature Tcw is lower than or equal to the predetermined threshold (YES in step S2 and YES in step S3), determination on a GND short circuit and disconnection is performed (step S4). If the elapsed time from the halt of the engine 1 is shorter than predetermined time (NO in step S10) and the outside air temperature is lower than the predetermined outside air threshold temperature (NO in step S9), energization of the heater 52 is performed (step S8).

Thus, if the engine 1 is in a hot state and the temperature of the heater 52 can be estimated as being high, fault determination for non-energization of the heater 52 can be avoided. Accordingly, false detection in a state where the internal resistance value of the heater 52 is high can be reduced and the accuracy of fault determination during non-energization of the heater 52 can be further increased. In the present embodiment, since the temperature state of the engine 1, and thus the temperature state of the heater 52, can be estimated in step S10, determination on the temperature state of the engine 1 based on the cooling water temperature (steps S3 and S4) may be omitted.

Next, a skid steer loader 151 on which the engine 1 is mounted is described with reference to FIGS. 20 and 21. The skid steer loader 151 as a work vehicle illustrated in FIGS.

20 and 21 performs loading operation with a later-described loader unit 152 attached thereto. In the description below, in the advance direction of the skid steer loader 151, the left side is simply referred to as the left side. Similarly, the right side in the advance direction is simply referred to as the right side. Left and right traveling crawler units 154 are attached to the skid steer loader 151. An openable hood 155 is provided over the traveling crawler units 154 of the skid steer loader 151. The engine 1 is accommodated inside the hood 155. Inside the hood 155, the first case 28 and the second case 29 (the exhaust purifier 27) are provided and fixed over an upper surface portion of the engine 1.

The engine 1 is supported by a traveling body 156 of the skid steer loader 151 with interposition of a vibration damping member or the like. A cabin 157 where a driver comes aboard is positioned further forward (i.e. in the advance direction) than the hood 155. A control lever 158, a driving seat 159, and the like are provided in the cabin 157. A loading operation hydraulic pump unit 160, which is driven with the engine 1, and a traveling transmission unit 161, which is used to drive the left and right traveling crawler units 154, are further provided. Motive force from the engine 1 is transmitted to the left and right traveling crawler units 154 through the traveling transmission unit 161. The operator sitting on the driving seat 159 can perform traveling operation and the like of the skid steer loader 151 using an operating unit including the control lever 158 for example.

The loader unit 152 includes loader posts 162, a pair of left and right lift arms 163, and a bucket 164. The loader posts 162 are provided on the left and right sides of the traveling body 156. The lift arms 163 are coupled to the respective upper ends of the loader posts 162 so that the lift arms 163 can rock upward and downward. The bucket 164 is coupled to distal end portions of the left and right lift arms 163 so that the bucket 164 can rock upward and downward.

Lift cylinders 166 for rocking the lift arms 163 upward and downward are provided between the loader posts 162 and the lift arms 163 corresponding to the loader posts 162. Bucket cylinders 168 for rocking the bucket 164 upward and downward are provided between the left and right lift arms 163 and the bucket 164. In this case, when the operator on the driving seat 159 actuates a loader lever (not illustrated), hydraulic force of the loading operation hydraulic pump unit 160 is controlled to cause extension and contraction movements of the lift cylinders 166 or the bucket cylinders 168 and rock the lift arms 163 or the bucket 164 upward and downward. Accordingly, loading operation is performed. A urea water tank 71 for exhaust gas purification is provided inside the hood 155, namely in an upper front side portion of the hood 155. The radiator 19 provided to face the cooling fan 24 is provided inside the hood 155, namely in a rear portion of the hood 155.

As illustrated in FIGS. 8 to 19, in the embodiments, the engine unit includes the heater 52 provided in the blow-by gas returning pipe 51 as the blow-by gas returning path for returning blow-by gas that leaks out from the combustion chamber of the engine 1 to the intake pipe 49 as the intake path, the heater 52 being electrically connected to the engine ECU 100 of the engine 1 through the electric wires 114 and 115 as the wiring harness, the engine ECU 100 being configured to, while controlling energization of the heater 52, perform abnormality detection on the grounded side electric wire 114 based on magnitude of current flowing to the grounded side electric wire 114 during energization of the heater 52, and perform abnormality detection on the heater 52 and the electric wires 114 and 115 based on magnitude of voltage applied to the grounded side electric wire 114 located downstream from the heater 52 during non-energization of the heater 52. Accordingly, a fault of the heater 52 provided in the blow-by gas returning path and the electric wires 114 and 115 connected to the heater 52 can be detected.

Further, in the embodiments, the engine ECU 100 performs abnormality detection for non-energization of the heater if the temperature of the heater 52 is lower than or equal to a predetermined heater threshold temperature. Thus, false detection caused by the internal resistance value of the heater 52 rising with a high temperature of the heater 52 can be avoided and the accuracy of fault detection in the heater 52 can be increased.

Moreover, in the embodiments, the engine ECU 100 detects the temperature of the heater 52 based on a detected value of the cooling water temperature sensor 103 that detects the cooling water temperature of the engine 1, a detected value of the fresh air temperature sensor 53 that detects the temperature of fresh air guided to the intake path, or a detected value of the outside air temperature sensor 104 that detects the outside air temperature. Accordingly, the temperature of the heater 52 can be estimated and if the heater 52 has a high temperature (its internal resistance value is high), fault detection for non-energization can be avoided. As a result, the accuracy of fault detection in the heater 52 can be increased. In particular, use of the cooling water temperature sensor 103, the fresh air temperature sensor 53, or the outside air temperature sensor 104 makes it possible to estimate the temperature of the heater 52 with an already-existing sensor without providing a dedicated component for directly detecting the temperature of the heater 52. Accordingly, increase in manufacture cost can be suppressed. In estimating the temperature of the heater 52, it is preferable to employ a detected value of the cooling water temperature sensor 103 from among detected values of the cooling water temperature sensor 103, the fresh air temperature sensor 53, and the outside air temperature sensor 104. For example, if the ambient temperature of a vehicle or the like on which the engine 1 is mounted changes greatly in some cases, which include a case where a move occurs from an indoor operating situation on a work vehicle such as a forklift to an outdoor cold climate area, a case where a move occurs from an outdoor cold climate area to an indoor operating place, and a case where a move occurs in summer from an outdoor operating place to an indoor place such as a freezer, a detected value of the outside air temperature sensor 104 or the fresh air temperature sensor 53 changes immediately with change in ambient temperature. Consequently, a problem arises in the estimation accuracy of the temperature of the heater 52. In contrast, even if the ambient temperature abruptly changes, the cooling water temperature of the engine 1 exhibits no abrupt change and correlates with the blow-by gas temperature to some extent. It is therefore preferable to use a detected value of the cooling water temperature sensor 103 in estimating the temperature of the heater 52. Accordingly, the estimation accuracy of the temperature of the heater 52 can be increased.

The present invention is not limited to the above-described embodiments but can be embodied in various forms. The structures of the elements are not limited to the illustrated embodiments but can be changed variously within the scope not departing from the gist of the present invention.

REFERENCE SIGNS LIST 1 engine
49 intake pipe 50 breather chamber
51 blow-by gas returning pipe
52 heater
53 fresh air temperature sensor
54 wiring harness
100 engine ECU (controller)
103 cooling water temperature sensor
104 outside air temperature sensor
114 grounded side electric wire
115 ungrounded side electric wire

The invention claimed is:

1. An engine unit comprising a heater provided in a blow-by gas returning path for returning blow-by gas that leaks out from a combustion chamber of an engine to an intake path, wherein:
the heater is electrically connected to a controller of the engine through a wiring harness,
the controller is configured to:
while controlling energization of the heater, perform an abnormality detection on the wiring harness based on a magnitude of current flowing to the wiring harness during the energization of the heater, and
perform an abnormality detection on the heater and the wiring harness based on a magnitude of voltage applied to the wiring harness located downstream from the heater during non-energization of the heater, and
based on a temperature of the heater being lower than or equal to a predetermined heater threshold temperature, perform the abnormality detection for the non-energization of the heater, and detect the temperature of the heater based on a detected value of a cooling water temperature sensor, a fresh air temperature sensor, or an outside air temperature sensor,
wherein the cooling water temperature sensor is configured to detect a cooling water temperature of the engine, the fresh air temperature sensor is configured to detect a temperature of fresh air guided to the intake path, and the outside air temperature sensor is configured to detect an outside air temperature.

2. The engine unit according to claim 1, wherein the controller is configured to perform the abnormality detection for the non-energization of the heater if a key switch is turned on.

3. The engine unit according to claim 1, wherein the controller is configured to perform the abnormality detection for the non-energization of the heater if a key switch is turned on and an elapsed time from a halt of the engine is longer than or equal to a predetermined time.

4. An apparatus comprising:
an engine control unit (ECU) configured to be electrically coupled to a heater disposed within a blow-by gas returning pipe of an engine, the ECU further configured to:
perform, during non-energization of the heater, a first abnormality detection on the heater based on a magnitude of voltage;
perform, during energization of the heater, a second abnormality detection on the heater based on a magnitude of current; and
based on detection of a fault in response to the first abnormality detection or the second abnormality detection, generate an error signal.

5. The apparatus according to claim 4, wherein the ECU is further configured to transmit the error signal.

6. The apparatus according to claim 4, further comprising the heater, the heater including a heating element, a first electric wire located downstream of the heating element, a second electric wire located upstream of the heating element, or a combination thereof.

7. The apparatus according to claim 4, further comprising one or more sensors coupled to the ECU.

8. The apparatus according to claim 4, wherein the ECU comprises a main controller, a fault detection circuit, an overcurrent protection circuit, a switching element, or a combination thereof.

9. The apparatus according to claim 4, wherein:
the ECU is coupled to the heater via a wiring harness;
the magnitude of voltage, the magnitude of current, or both, correspond to the wiring harness.

10. The apparatus according to claim 4, wherein the ECU is further configured to, based on the detection of the fault from the second abnormality detection, perform de-energization of the heater.

11. The apparatus according to claim 10, wherein the ECU is further configured to determine a temperature of the heater.

12. The apparatus according to claim 11, wherein, to determine the temperature of the heater, the ECU is configured to:
detect a cooling water temperature via a first sensor; and
calculate the temperature of the heater based on the cooling water temperature.

13. The apparatus according to claim 11, wherein, to determine the temperature of the heater, the ECU is configured to:
detect an outside air temperature via a second sensor; and
calculate the temperature of the heater based on the outside air temperature.

14. The apparatus according to claim 11, wherein, to determine the temperature of the heater, the ECU is configured to:
detect an intake path temperature via a third sensor; and
calculate the temperature of the heater based on the intake path temperature.

15. The apparatus according to claim 11, wherein the ECU is further configured to, based on the temperature of the heater being less than or equal to a threshold, perform the first abnormality detection.

16. The apparatus according to claim 15, wherein the ECU is further configured to, based on a determination of no-fault from the first abnormality detection, perform energization of the heater.

17. The apparatus according to claim 16, wherein the ECU is further configured to, based on the temperature of the heater being greater than or equal to the threshold, perform energization of the heater.

18. The apparatus according to claim 15, wherein the ECU is further configured to, based on a determination of no-fault from the second abnormality detection, perform energization of the heater.

19. The apparatus according to claim 18, wherein the ECU is further configured to, based on the temperature of the heater being greater than or equal to the threshold, perform energization of the heater.

20. The apparatus according to claim 15, wherein the ECU is further configured to, based on the temperature of the heater being greater than or equal to the threshold, perform energization of the heater.

* * * * *